US008983497B2

(12) United States Patent
Ziskind et al.

(10) Patent No.: US 8,983,497 B2
(45) Date of Patent: Mar. 17, 2015

(54) METHOD FOR MANAGING A GEO-TARGETED CAMPAIGN

(71) Applicant: ZOS Communications, LLC, Santa Barbara, CA (US)

(72) Inventors: Russell Ziskind, Webster, NY (US); Chris McKechney, Marion, NY (US)

(73) Assignee: ZOS Communications, LLC, Webster, NY (US)

( * ) Notice: Subject to any disclaimer, the term of this patent is extended or adjusted under 35 U.S.C. 154(b) by 133 days.

(21) Appl. No.: 13/730,196

(22) Filed: Dec. 28, 2012

(65) Prior Publication Data

US 2013/0115972 A1 May 9, 2013

Related U.S. Application Data

(63) Continuation-in-part of application No. 12/245,657, filed on Oct. 3, 2008, now Pat. No. 8,280,406, and a continuation-in-part of application No. 12/245,663, filed on Oct. 3, 2008, now Pat. No. 8,165,604, and a continuation-in-part of application No. 12/245,641, filed on Oct. 3, 2008, now Pat. No. 8,155,669, and a continuation-in-part of application No. 12/245,668, filed on Oct. 3, 2008.

(60) Provisional application No. 61/581,603, filed on Dec. 29, 2011, provisional application No. 60/997,669, filed on Oct. 4, 2007, provisional application No. 61/189,681, filed on Aug. 21, 2008.

(51) Int. Cl.
*H04W 4/02* (2009.01)
*G06Q 30/02* (2012.01)
*H04W 4/20* (2009.01)
*G01C 21/36* (2006.01)

(52) U.S. Cl.
CPC ............. *H04W 4/02* (2013.01); *G01C 21/3682* (2013.01); *G06Q 30/0205* (2013.01); *H04W 4/021* (2013.01); *H04W 4/206* (2013.01)
USPC ...................................................... 455/456.2

(58) Field of Classification Search
CPC ......... H04W 64/00; H04W 4/02; H04W 4/12; H04W 4/14
USPC ........ 455/456.1, 456.2, 456.3, 458, 466, 574, 455/9, 412.1, 412.2, 413, 414.1, 457, 566
See application file for complete search history.

(56) References Cited

U.S. PATENT DOCUMENTS

| | | | |
|---|---|---|---|
| 5,684,859 | A | 11/1997 | Chanroo et al. |
| 6,199,045 | B1 | 3/2001 | Giniger et al. |
| 6,378,069 | B1 | 4/2002 | Sandler et al. |
| 6,456,854 | B1 | 9/2002 | Chern et al. |
| 6,463,473 | B1 | 10/2002 | Gubbi |
| 6,968,184 | B2 | 11/2005 | Criss et al. |

(Continued)

*Primary Examiner* — Cong Tran
(74) *Attorney, Agent, or Firm* — Baker & Hostetler LLP

(57) ABSTRACT

An embodiment is directed to a method for managing a geo-targeted campaign. A user defines a campaign by specifying devices eligible to receive the material associated with the campaign, landmarks defining points of interest and areas associated with the campaign, and triggers that enable the material to be delivered to devices based on a set of conditions. In an embodiment, a console provides controls for defining devices, landmarks, and events. The console includes a wizard for creating events and a visualization layer that allows a user to visualize devices and landmarks on a map.

16 Claims, 15 Drawing Sheets

(56) References Cited

U.S. PATENT DOCUMENTS

| | | | |
|---|---|---|---|
| 7,085,555 | B2 | 8/2006 | Zellner et al. |
| 7,205,890 | B2 | 4/2007 | Defant et al. |
| 7,236,775 | B2 | 6/2007 | Chun et al. |
| 7,248,880 | B2 | 7/2007 | Gheorghiu et al. |
| 7,248,884 | B2 | 7/2007 | Miyamoto |
| 7,269,426 | B2 | 9/2007 | Kokkonen et al. |
| 7,458,184 | B2 | 12/2008 | Lohtia |
| 7,533,343 | B2 | 5/2009 | Ratnakar |
| 7,630,724 | B2 | 12/2009 | Beyer et al. |
| 7,688,260 | B2 | 3/2010 | Pomerantz et al. |
| 7,751,356 | B2 | 7/2010 | Kim et al. |
| 7,826,830 | B1 | 11/2010 | Patel et al. |
| 7,917,183 | B2 | 3/2011 | Ryu et al. |
| 7,950,026 | B1 | 5/2011 | Urbach |
| 8,155,669 | B2 | 4/2012 | Ziskind et al. |
| 8,165,604 | B2 | 4/2012 | Ziskind et al. |
| 8,280,406 | B2 | 10/2012 | Ziskind et al. |
| 2001/0054066 | A1 | 12/2001 | Spitzer |
| 2003/0143988 | A1 | 7/2003 | Jamadagni |
| 2003/0182052 | A1 | 9/2003 | DeLorme et al. |
| 2004/0044576 | A1 | 3/2004 | Kurihara et al. |
| 2004/0068364 | A1 | 4/2004 | Zhao et al. |
| 2004/0203681 | A1 | 10/2004 | Ross et al. |
| 2004/0203929 | A1 | 10/2004 | Akhteruzzaman |
| 2005/0033511 | A1 | 2/2005 | Pechatnikov et al. |
| 2005/0080555 | A1 | 4/2005 | Parupudi et al. |
| 2005/0083909 | A1 | 4/2005 | Kuusinen et al. |
| 2005/0113123 | A1 | 5/2005 | Torvinen |
| 2005/0245241 | A1 | 11/2005 | Durand et al. |
| 2005/0255853 | A1 | 11/2005 | Ewert et al. |
| 2006/0022048 | A1 | 2/2006 | Johnson |
| 2006/0099970 | A1 | 5/2006 | Morgan et al. |
| 2006/0225108 | A1 * | 10/2006 | Tabassi et al. ................ 725/100 |
| 2006/0253453 | A1 | 11/2006 | Chmaytelli et al. |
| 2006/0256008 | A1 | 11/2006 | Rosenberg |
| 2007/0038362 | A1 | 2/2007 | Gueziec et al. |
| 2007/0149214 | A1 | 6/2007 | Walsh et al. |
| 2007/0200713 | A1 * | 8/2007 | Weber et al. ............... 340/573.1 |
| 2007/0270164 | A1 | 11/2007 | Maier et al. |
| 2007/0270165 | A1 | 11/2007 | Poosala |
| 2008/0081601 | A1 | 4/2008 | Moshir et al. |
| 2008/0119174 | A1 | 5/2008 | Farkas et al. |
| 2008/0133599 | A1 | 6/2008 | Stewart et al. |
| 2008/0178175 | A1 | 7/2008 | Woundy et al. |
| 2008/0228654 | A1 | 9/2008 | Edge |
| 2008/0301580 | A1 | 12/2008 | Hjelmeland Alams et al. |
| 2009/0094602 | A1 | 4/2009 | Ziskind et al. |

* cited by examiner

| Build Landmark | |
|---|---|
| Group | South Reno |
| Name: | |
| Draw Area Manually | |
| Draw Circle | Enter radius in meters: |
| Draw Nav Points | |
| Address: | |
| Draw Point from Address | Draw Circle from Address |
| Close | Save |

```
<MESSAGE>
<TITLE>LATE NIGHT B1G1 FREE</TITLE>
<NOTE>ENJOY A TASTY BURGER!&LT;BR /&GT; &LT;BR /&GT;
&LT;IMG WIDTH="300" SRC="HTTPS://ZOSCOMMCONSOLE.
S3.AMAZONAWS.COM/3011/B1G1FREE.JPG"/
&GT;&LT;BR /&GT; &LT;BR /&GT; &LT;A SHAPE="RECT"
HREF="HTTP://WWW.ZOSCOMM.COM" TARGET="_SELF"&BROUGHT TO
YOU BY ZOS&LT;/A&GT;
</NOTE>
</MESSAGE>
```

METHOD FOR MANAGING A GEO-TARGETED CAMPAIGN

CROSS REFERENCE TO RELATED APPLICATIONS

This application claims benefit under 35 U.S.C. §119(e) of Provisional U.S. Patent Application No. 61/581,603, filed Dec. 29, 2011, the contents of which is incorporated herein by reference in its entirety.

This application is a continuation-in-part of U.S. patent application Ser. No. 12/245,657, filed Oct. 3, 2008, now U.S. Pat. No. 8,280,406, issued Oct. 2, 2012; U.S. patent application Ser. No. 12/245,663, filed Oct. 3, 2008, now U.S. Pat. No. 8,165,604, issued Apr. 24, 2012; U.S. patent application Ser. No. 12/245,641, filed Oct. 3, 2008, now U.S. Pat. No. 8,155,669, issued Apr. 10, 2012; and U.S. patent application Ser. No. 12/245,668, filed Oct. 3, 2008. These applications claim priority to provisional patent applications Ser. No. 60/997,669, filed Oct. 4, 2007 and Ser. No. 61/189,681, filed Aug. 21, 2008. All of the applications listed herein are incorporated by reference in their entirety.

TECHNICAL FIELD

An embodiment is directed to a method for managing a geo-targeted campaign. A user defines a campaign by specifying devices eligible to receive the material associated with the campaign, landmarks defining points of interest and areas associated with the campaign, and triggers that enable the material to be delivered to devices based on a set of conditions. A console provides a user interface with controls enabling the user to define devices, landmarks, and events. The console includes a wizard for creating events and a visualization layer that allows a user to visualize devices and landmarks on a map.

BACKGROUND

Wireless communication providers offer a number of global information service (GIS) and location based service (LBS) applications. For example, VERIZON offers the VZNAVIGATOR navigation system and AT&T and SPRINT offer the TELENAV navigation system for mobile devices, such as smart phones by SONY, NOKIA and MOTOROLA. Both of these navigation systems use global positioning satellite (GPS) data to tell users where they are, to locate nearby places of interest, and to provide them with directions to desired locations. By navigating through a large number of different menu choices and screens, a user can find a location and get directions in two ways: (1) selecting a location from a list of pre-identified locations (either by name or within categories); or (2) entering a valid address into appropriate fields on a screen to receive directions or a map to the desired address. A pre-identified location is one that the wireless communication provider or navigation system provider has previously selected and entered necessary data so as to enable the user to be provided with directions or a map to that location without having to enter the address.

The process of entering an address can be simplified through the use of a voice command system that allows the user to speak certain commands to their mobile device in order to get that mobile device to accept an address, and then speaking the address out loud to the device in order to get it to provide directions. Adding voice recognition functionality to a mobile device increases the cost of that device and does not necessarily improve its functionality. Despite significant improvements in recent years, voice recognition systems remain highly unreliable, so users can readily enter incorrect address information. Further, if a user is attempting to enter an address for some place they want to go, they must have the address with them first so they can speak it. This requires the user to either memorize the address, which can be difficult, or to write the address down. If they are driving or walking at the time, this might be impossible or quite dangerous. By the time a user has written the address down, and then spoken the address to their mobile device, the benefits of voice recognition will not have been realized.

A number of so-called "geosocial networking" companies, such as YELP, GOWALLA and FOURSQUARE, offer geolocation services that enable users within the same geosocial network to find one another. Geolocation generally refers to the association of a geographic location to an Internet connected device, such as a mobile device. If two mobile devices each have a geolocation (or geocode or geotag), the corresponding geographic locations of those devices can be shown on the map, thereby enabling the users of the devices to find each other. Geosocial networking companies take advantage of this feature to enable users of their social networking software and services to find each other. However, generally this feature is only available to users of the same social network who happen to be on each other's so-called "friends" or "buddy" lists. To expand this type of service to a larger group of people would be difficult because each map would include so many people that it would be difficult to discern one user from another. The service also only works well within a limited geographic region, such as a portion of a large metropolitan city. According, this type of service has not been expanded to other out-of-network applications.

DETAILED DESCRIPTION OF ILLUSTRATIVE EMBODIMENTS

The present disclosure is directed to systems and methods for sending first geographic location information from a computing device to a receiving device that will enable the receiving device to display a map and/or directions from a geographic location of the receiving device to the first geographic location. The first geographic location can correspond to the sending device or any other geographically locatable position. The receiving device can be a smart phone type device that is GPS-enabled (or utilizes other location aware services) and has access to mapping software, or a simpler mobile phone that is capable of receiving directions and/or a map to the first geographic location.

Figure 1:
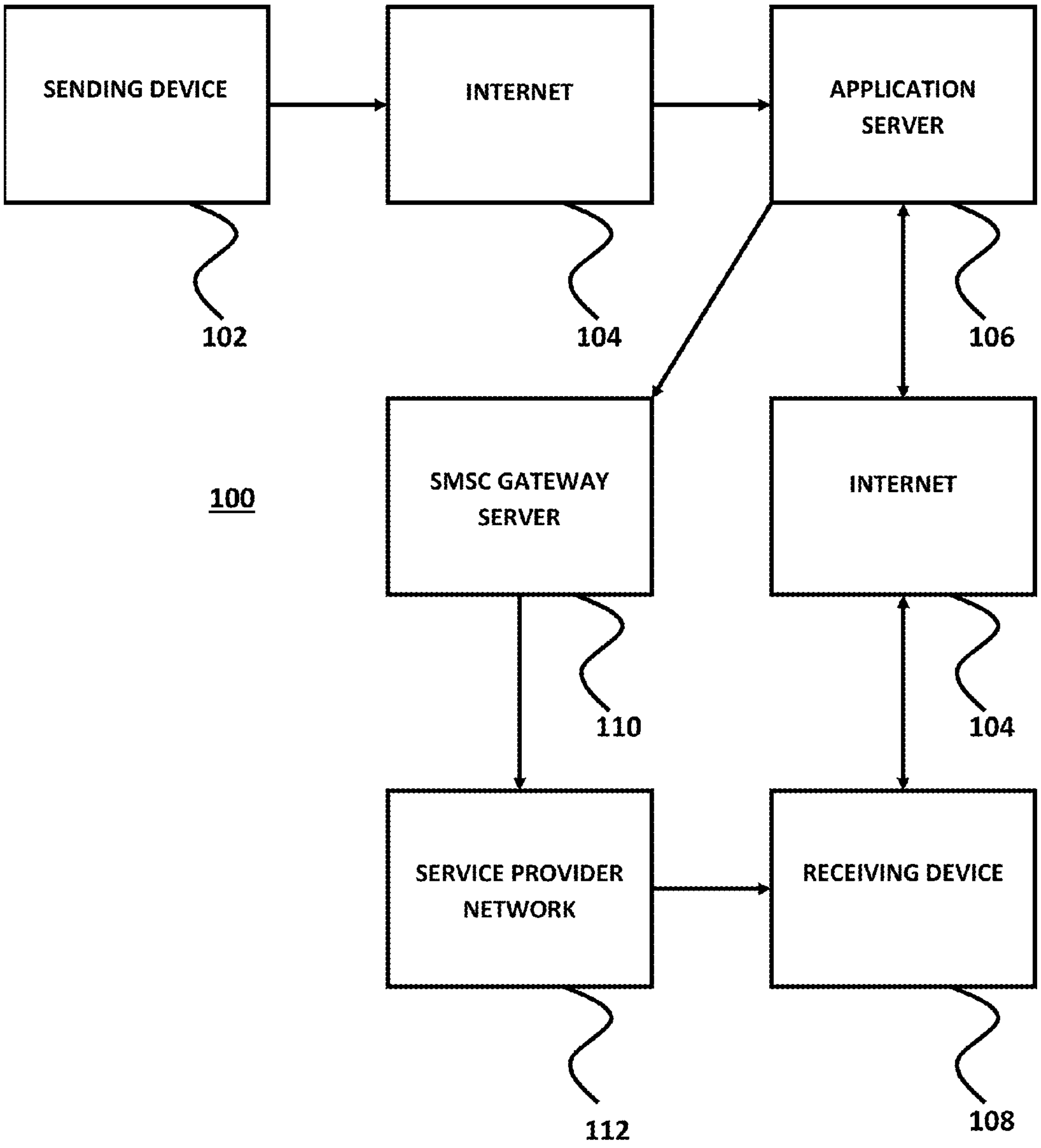
FIG. 1 is a block diagram illustrating an exemplary system architecture of an embodiment.

FIG. 1 illustrates a high level system architecture of the overall system 100 of an embodiment, in which a sending device 102, such as a computer or a mobile device (i.e. smart phone, mobile phone or other computerized communication device), sends a location request, i.e., a data message utilizing a HyperText Transfer Protocol (HTTP) connection, through the Internet 104 to the application server 106, which then communicates location information to the receiving device 108. A location request is herein referred to as a ZHIING® request. (ZHIING is a registered trademark of the assignee of the present disclosure). This ZHIING request can be generated in a number of ways. One, the sender can open an appropriate software application on the sending device that allows the sender to highlight (then click on a browser applet further described below) or open a window or dialogue box in which the user can type in the target address and send it to the receiving device 108 through the application server 106. Two, the sender can select an icon (corresponding to the target address and installed by a browser plug-in further described below) within a web page displayed on the sending device, which causes the aforementioned software application to open and enable the sender to send the location request.

A third way of sending a ZHIING request from a mobile device to another mobile device is also described below. Hence, the ZHIING request includes at least the target address and a phone number corresponding to the receiving device, but could include additional information as well. For example, the ZHIING request could include the user's Internet Protocol (IP) address and the Uniform Resource Locator (URL) for the web page from which the ZHIING request is being generated, as well as a title or subject for the request, some form of identification of the sender, and a note or message.

Upon receipt of the location request, the application server 106 will determine whether the receiving device (based on its unique identifier, such as a phone number, IP address, or some other form of identification) has previously received and responded to a ZHIING message. A ZHIING message is a certain type of message sent from the application server 106 to the receiving device 108. If the receiving device has previously received and responded to a ZHIING message, then the receiving device will have the ZHIING manager software already installed and will be ready to respond to the next ZHIING message. Since the application server keeps track of all of the receiving devices (based on their unique identifiers) that have installed the ZHIING manager, it will know, before sending a ZHIING message to a receiving device, whether the receiving device represents a prior user or a new user.

Depending on the nature of the receiving device, if the ZHIING manager has already been installed, the application server may send a SMS message to the receiving device 108 through the Short Message Service (SMS) Center (SMSC) gateway server 110 (directly if possible, or through the service provider network 112 providing communication services to the receiving device 108 if necessary). The SMS message causes the ZHIING manager to turn on and communicate directly with the application server. If the ZHIING manager has not been installed, the application server 106 will send an SMS message to the receiving device (through the gateway server 110) that provides a link for downloading the ZHIING manager to the receiving device. The content of SMS messages are described in greater detail below.

Although the preferred embodiment of the present disclosure utilizes SMS text messaging as the transport mechanism for ZHIING messages (because the majority of mobile phones are SMS-enabled), many other transport mechanisms could be utilized, such as MMS and electronic mail. Communication between the application server and the receiving device could also be enabled through the use of IP addresses and/or Uniform Resource Locators (URL), by taking advantage of other data transfer protocols available over the Internet. In one embodiment, SMS can be used as the fall back transport mechanism for other data and IP communication mechanisms have failed.

As noted above, certain types of receiving devices 108 might enable different communication modes or require different forms of data to be exchanged, so the diagram of FIG. 1 and the description set forth above are merely intended to be exemplary and are not inclusive of all of the different forms of communication that might be possible with a receiving device 108 in order to send a ZHIING request or to enable a ZHIING message. For example, if the receiving device 108 is GPS-enabled and has access to mapping software, it would not be necessary to send direction or mapping information directly to the receiving device to enable it to identify, to the user, the target street location or target location. Rather, the receiving device 108 would be able to pull the necessary information from a server providing such data via its mapping software, as further described below.

However, even if the receiving device is not GPS-enabled, it may still be able to receive a ZHIING message and provide the user with directions, by, for example, having the application server 106 communicate directly with the receiving device 108 to provide it with a map and/or text-based directions. Other forms of location aware services that could be used by the receiving device include General Packet Radio Service (GPRS), triangulation, and Wi-Fi-based services. And, even if the mobile device does not have any location aware service available, a user could be "prompted" to respond to a ZHIING message with their current location so the user could be supplied with a route map and/or directions from their current location to a target location.

Finally, the sending and receiving devices do not need to be mobile phones. Any type of wireless or wired communication device could utilize the present disclosure, although the utility of doing so will depend on the device. For example, while it might be possible to send a ZHIING message to a desktop computer, it would not be possible to pick the desktop computer up and follow the map or directions that are provided. However, it could be possible to print that map or directions. Like, certain navigation devices could benefit from present embodiments, where specific direction to a target address could be sent directly to the device, thereby saving the user from having to enter the target address into the device in order to get directions. Utilization of present embodiments in emergency responder vehicles could reduce by minutes the amount of time it requires such a vehicle to get to a target address, thereby saving lives.

The systems and methods described herein involve a number of different components that enable ZHIING requests and ZHIING messages to be sent and received in a number of ways. For example, as briefly described above, there are two methods for sending a ZHIING request utilizing the browser of a sending device 102 connected to the Internet 104: an applet and a browser plug-in. An applet is a software component that runs in the context of another program, such as a web browser, and that performs a relatively narrow function that has no independent use. A plug-in, or similar type of extension, is a software program that interacts with a host application, such as a web browser, to provide a certain specific function. Although applets and plug-ins in accordance with embodiments can be created and installed to operate with any browser, only the FIREFOX browser developed by Mozilla Foundation is used herein to describe the features of the applet and plug-in. Use of the FIREFOX browser to describe features of embodiments is exemplary only and should not be construed to limit the present disclosure to just the particular description contained herein. Furthermore, both the applet and the plug-in are described in the context of their installation on a computer because the functionality of browser software on smaller mobile devices, such as mobile phones is too limited at the present time to support the functions of applets and plug-ins. However, it is assumed that mobile phones and browser technology will continue to evolve and the applet and plug-in of the present disclosure, and similar software, will become fully functional over time.

Figure 2:
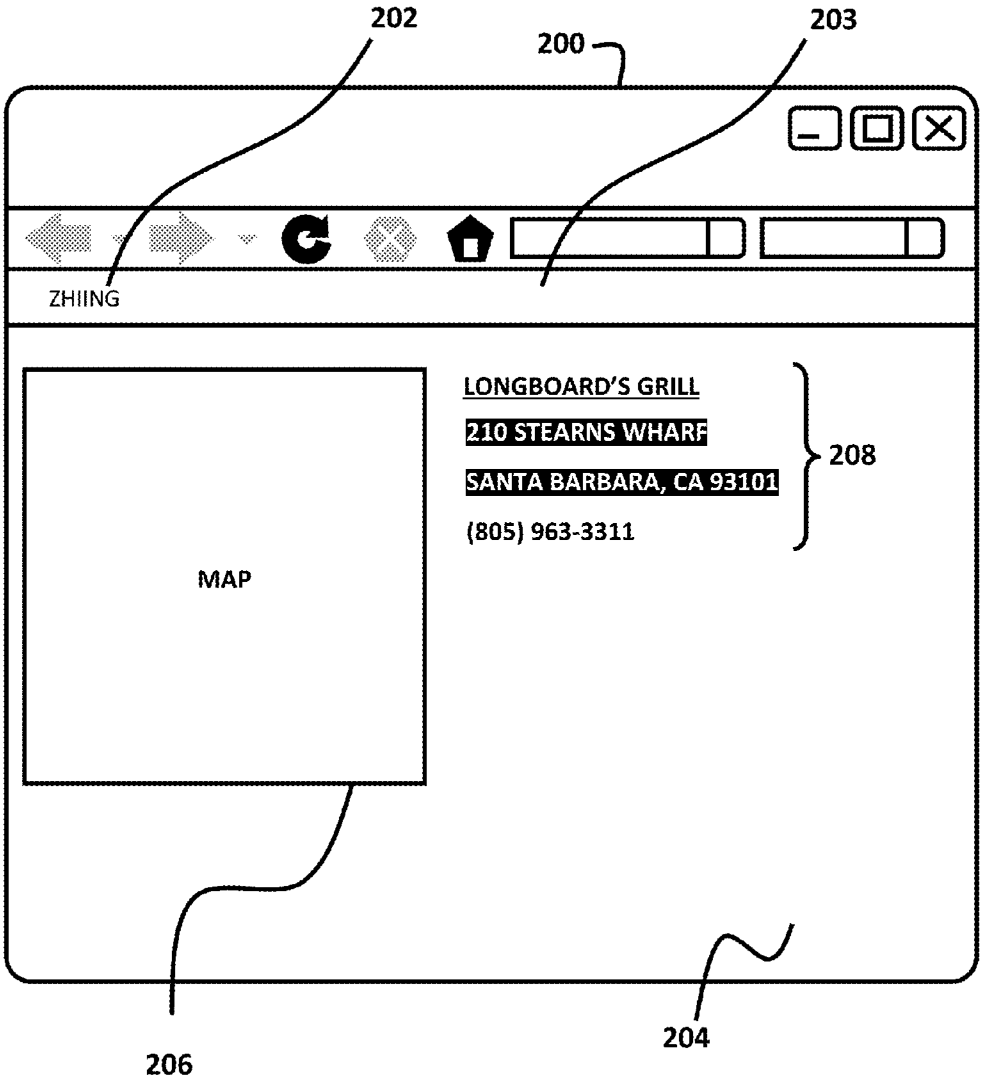
FIG. 2 illustrates a web page incorporating a browser applet in accordance with an embodiment.

As illustrated in FIG. 2, the applet is installed on the sending device 102 to run in the context of the browser also so installed. When the browser opens a window 200, a button or menu selection 202 is shown within the toolbar 203 of the browser window 200 to enable the user of the sending device 102 to access the functionality of the applet. The selection 202 could optionally be provided as a link in a bookmark bar as further noted below. The functionality of the applet enables the user to highlight any lines of text representing an address (essentially pieces of text) that appears on a web page 204 (in this case a search result that generates a map 206 and the name, address and phone number 208 of a restaurant, with the address portion highlighted), and then click on the ZHIING button selection 202 to bring up the ZHIING dialogue box or window 300.

Figure 3:
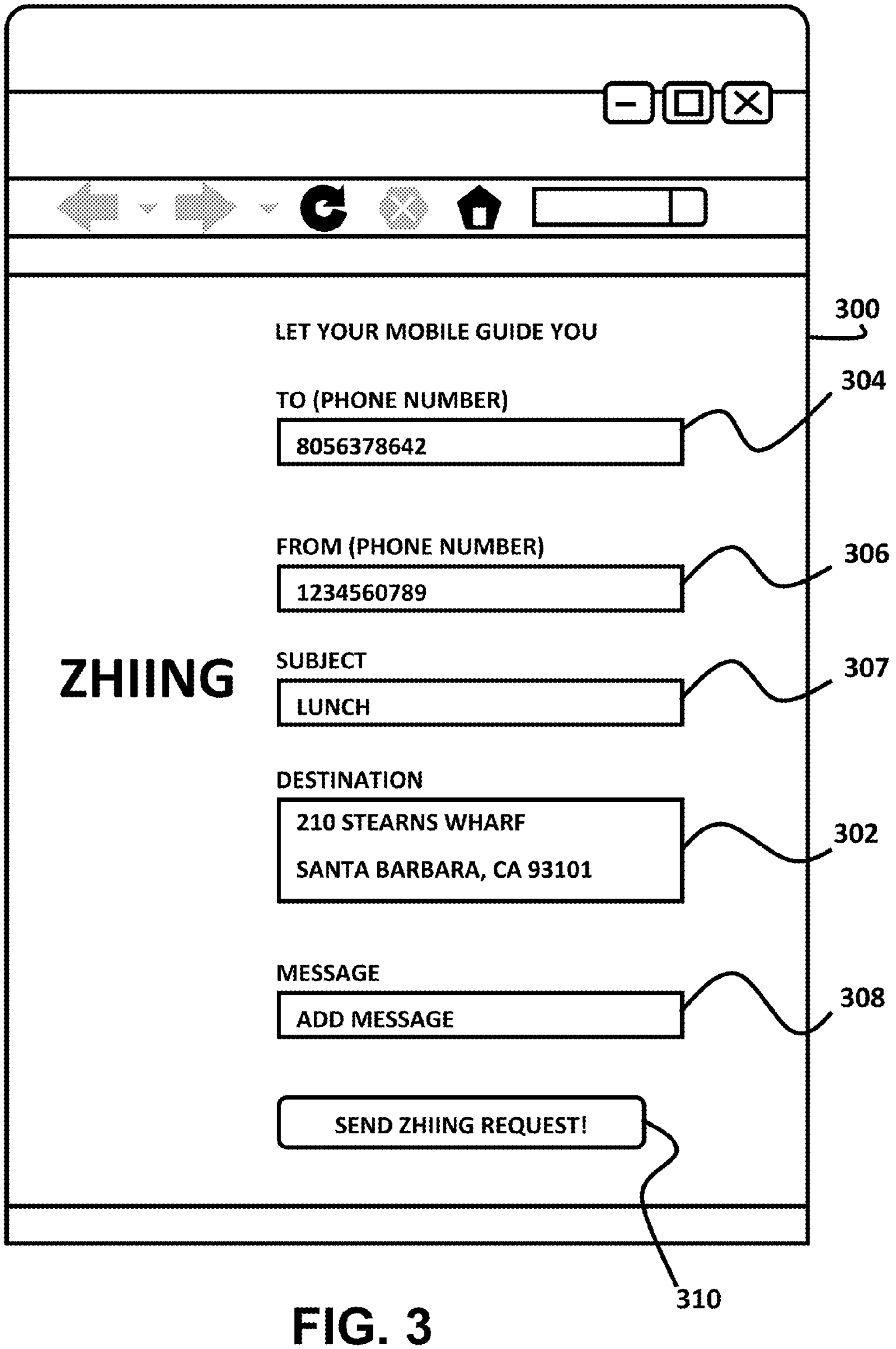
FIG. 3 illustrates a dialog box for use with a browser applet and browser plug-in in accordance with an embodiment.

As illustrated in FIG. 3, if the address 208 highlighted on the web page 204 is a valid address, the applet will copy the lines of text from the web page corresponding to the valid address and the window or dialogue box 300 will open with the destination or target address portion 302 already pasted or filled-in. If the address 208 is not valid, i.e., missing some aspect of a complete address, then the dialogue box 300 might open, but require the user to manually fill in the target address within an address field within the window 300. Alternatively, if the highlighted text 208 is not a valid address, the dialogue box 300 might not open so as to let the user know that the highlighted address is not valid. Naturally, other scenarios are possible.

The user would then fill in the phone number 304 for the receiving device 108 (to which the ZHIING request is being sent), the sender's identification (such as a name, phone number, or some other form of identifying text that would be appropriate for a "FROM" field) 306 (if the sender desires to provide one), and optional subject text 307 and message text 308 that the sender would like to send with the ZHIING request. Once the dialogue box 300 has been filled in, the user would send the ZHIING request by selecting the "Send ZHIING Request!" button 310, thereby causing the request to be sent to the application server 106.

In order to install the applet for use in association with a user's browser, the FIREFOX browser enables the user to simply drag a hyperlink (or link) corresponding to the applet into the bookmark area of the browser. Hence, a user could be sent an email that includes the applet link, or receive a ZHIING message from another party that includes the link, or obtain the link in many other ways. Once the link has been dragged and dropped into the browser, it will appear as a link in the bookmark bar.

The plug-in operates in a manner very similar to the applet except that the plug-in automatically places a ZHIING icon next to any valid address that appears on a web page being viewed by a browser that includes the plug-in. The ZHIING icon might be a brand logo or some other symbol that readily identifies itself. When the user clicks on a ZHIING icon, the dialogue box 300 is opened, the plug-in captures the address associated with the icon, and the corresponding destination/target address filed pre-filled in with the captured data. If the sending device has the ability to know the sender's unique identifier (whether the sender is using a computer, navigation device, mobile phone or other device), that unique identifier may also be pre-filled in, or a drop down menu could be provided that includes a list of previously used identifiers/phone numbers, if any. Likewise, if the user has previously used the dialogue box 300, the box 306 might include a drop down menu that includes a list of previously used receiving device identifiers/phone numbers.

Figure 4:
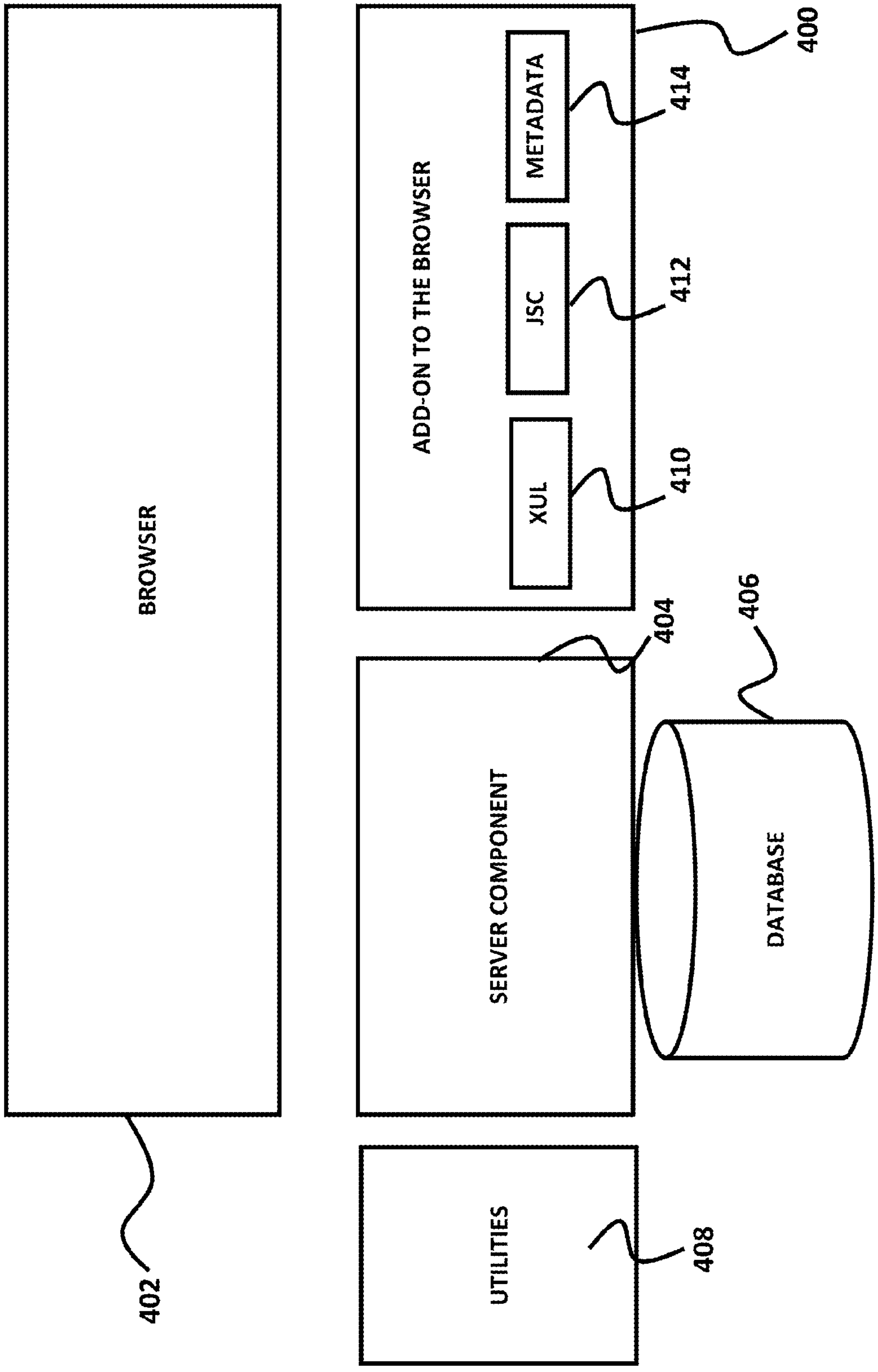
FIG. 4 illustrates a high level architecture of the browser plug-in referenced in FIG. 3.

To more fully understand the operation of the browser plug-in or add-on software, reference is now made to FIG. 4, which depicts an exemplary version of the add-on software 400 and its various component modules. The add-on software 400 would be installed by accessing a link on a web site or other message (as noted above) to the executable code that installs the software. Since the add-on software interacts with the browser 402 and takes advantage of its user interface and shares resources with the browser, a reduced amount of code is required to enable the software 400 to operate in a variety of different computing environments. While different browsers operate in different ways, requiring different add-on software 400 to be required to operate with each different browser, the software described in reference to FIG. 4 does provide an overall understanding of the operation of all such software in the context of the present disclosure.

As illustrated in FIG. 4, the add-on software 400 uses component modules of the browser 402, such as the server component 404, which is used by the add-on software 400 to interface with the application server 106, the database 406, and the utilities 408, which perform eXtended Markup Language (XML) Schema Definition (XSD) validation of each ZHIING request. ZHIING requests take the form of a XML document, so there are certain rules (the XSD) that the request must conform to in order to be considered valid. The other major component modules of the software 400 are the XML User Interface Language (XUL) 410, the JSC 412 and the metadata 414. XUL 410 is a well-known markup language developed by Mozilla for use in its cross-platform applications, such as FIREFOX. XUL 410 is the primary application code for the software 400, which enables it to be integrated with FIREFOX. JSC 412 is JavaScript that can be used for a number of different functions, such as popping up a window, as noted below, and controlling the size, position and attributes of that window, as well as validating data input by the user into the dialogue box 300 before sending that data to the application server 106. The metadata 414 component manages the data input by the user into the dialogue box 300.

Figure 5:
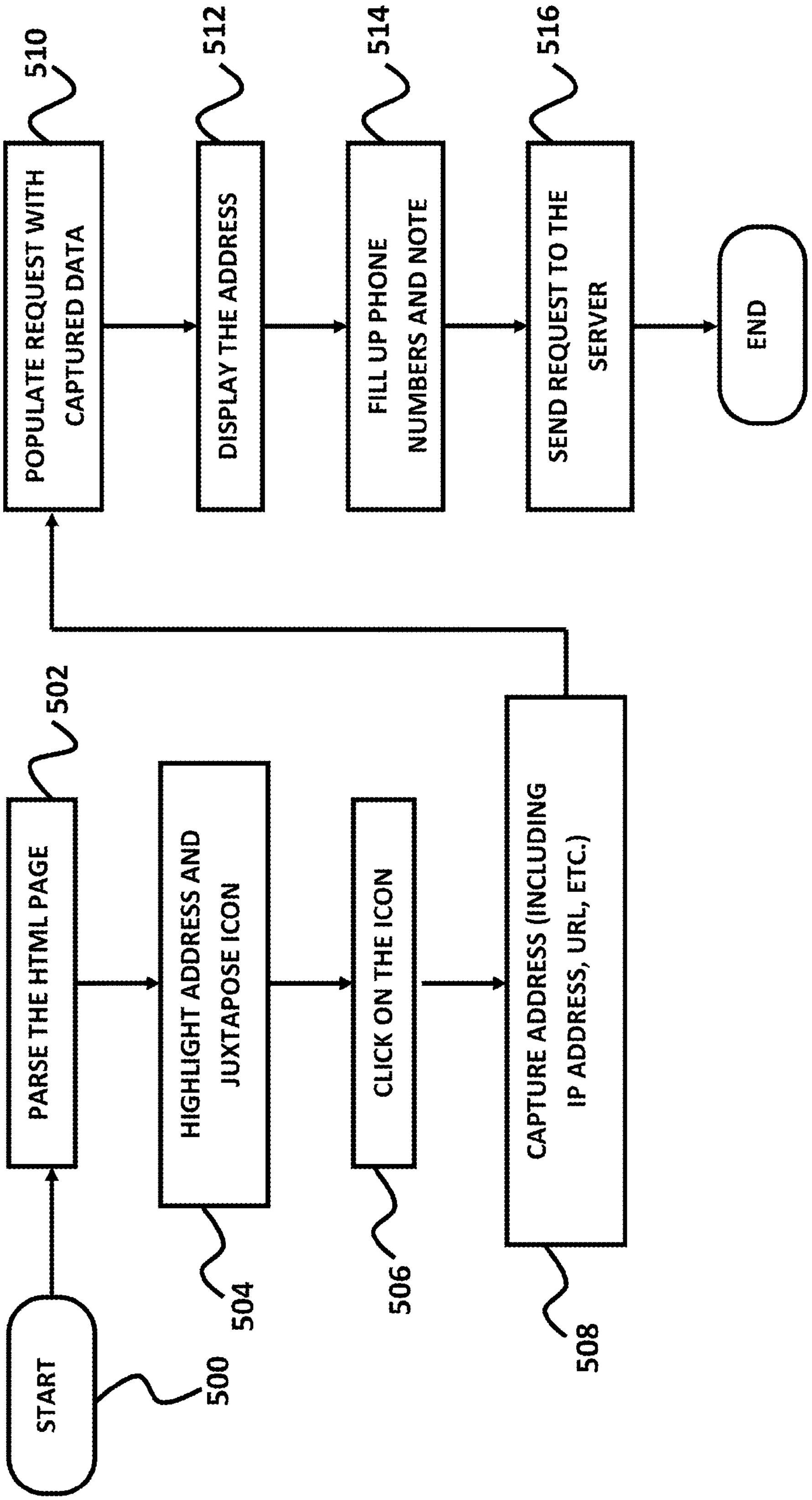
FIG. 5 is a flow diagram illustrating the operation of the browser plug-in of FIG. 4.

From a functional perspective, the add-on software 400 performs the following functions: (1) parsing, (2) extracting and (3) transforming. These functions will be further explained below in the context of the process flow diagram of FIG. 5, but the basic functions are as follows: (1) the parser or parsing function may operate in a number of different ways so as to enable valid addresses to be extracted, such as converting a HTML string from the web page 204 to XML format; (2) the extractor or extracting function then identifies valid addresses from the XML formatted material; and (3) the transformer or transforming function transforms the HTML content on the web page 204 corresponding to each extracted address so as to place the ZHIING icon next to each extracted address. The transformer also creates a hyperlink that corresponds to each ZHIING icon that includes the extracted address in the query parameter of the hyperlink.

As noted above, FIG. 5 illustrates the process flow followed by the add-on software 400 when identifying valid addresses within a web page and sending a ZHIING request to the application server 106. A valid address is defined as an address for which a ZHIING request can be sent. For example, when the add-on software 400 is being used in the United States, valid addresses might only include addresses within the United States that include a street name, city name, state name and zip code (or perhaps no zip code would be required). Valid addresses could also be limited in other ways, such as restricting addresses within certain parts of a town (perhaps a violent area), from being available for use in a ZHIING request. The time of day, the day of the week, and even mileage limits from one location to another, could be other forms of limitations on valid addresses.

After the add-on software 400 has been installed and a web page has been opened, the software 400 will start, block 500, by parsing the web page and extracting valid addresses, block 502. If any valid addresses are found, and the limitation restrictions for addresses do not prevent those addresses from being used in a ZHIING request, the addresses are highlighted and the ZHIING icon (hyperlink) is placed next to each corresponding address, block 504. As an alternative to limiting valid addresses during this part of the process, the add-on software 400 could permit all addresses to be identified as complete, and apply limitations at a later point in time, such as after the request has been sent and processed by the application server 106.

If the user of the web page clicks on one of the icons, block 506, the software 400 captures the associated address, including any other information that might be associated with the request, as noted above, such as an IP address of the user, the user's location (if known), the URL of the web page, or other information, block 508. The ZHIING request is then populated with the captured data, block 510, and displayed to the user, block 512, in window/dialogue box 300. After the user has filled in the phone numbers and message, block 514, the ZHIING request is sent to the application server 106. As an additional alternative embodiment, the software 400 could establish a database (perhaps within the storage of the sending device) of previously utilized target addresses, phone numbers of receiving devices, and other information previously entered by the user, or automatically, to make future use of the software 400 easier and/or faster.

The application server 106 will process the ZHIING request and send a ZHIING message to the SMSC gateway server 110, or directly to the receiving device if a different transport mechanism is utilized. If the message is sent to the server 110, it will then send the ZHIING message to the receiving device 108, as further described below. To process the ZHIING request, as further described below, the application server extracts the text representing the target address from the message and geocodes the target address (if not already sent in the form of a geographic location or geocode by the sending device), and posts the request to a database server. Generating a geocode, or geocoding, is the process of finding the geographic coordinates (such as latitude and longitude) associated with other geographic data, such as a street address or a zip code. The database server (which is shown as part of the application server 106 in the present disclosure, but could be a separate device physically connected to the application server 106 or remotely connected to the application server 106 through the Internet 104) records the transaction, performs a SMS routing lookup to determine the best path to the receiving device, and possibly generates targeted marking information to include in the ZHIING message.

The ability to include an advertisement or other information in a ZHIING message is an option. Given the rich information that exists regarding the user (location, interest, possible route, etc.), targeted marking information directed to the users of ZHIING messages could be quite valuable. If targeted marketing is implemented, the database server would determine appropriate content to include with the ZHIING message, much like well-known advertising servers operate on the web today, and make sure this content was included in the outgoing ZHIING message by the application server 106.

If the receiving device 108 has never previously received a ZHIING message, as determined by the application server's records (i.e., comparing the unique identification of the receiving device with a database or list of unique identifiers to which messages have previously been sent), the application server 106 will send the receiving device 108 instructions, in the form of a text message or other message, on how to download the ZHIING manager so the receiving device can receive the geocode associated with the present message and also send ZHIING requests in the future. While the text message instructions could be structured in many different ways, one simple preferred method is to ask the user in text if the user is interested in receiving ZHIING messages and then providing the user with a link that could be selected to access a host from which the ZHIING manager application could be downloaded. The user could also be asked to send their current location back to the application server. Regardless of the positive manner in which the user responds, the application server will now have the ability to download the ZHIING manager to the receiving device, which then enables the user to send their own ZHIING requests. Distributing the ZHIING manager is this fashion also creates a viral distribution or load of the ZHIING manager that promotes its rapid acceptance among a large portion of the population of potential users. Every user that receives a ZHIING message and downloads the ZHIING manager, suddenly becomes a potential sender of ZHIING requests, which are highly likely to be sent to other users that have not yet received a ZHIING request, and so on, until the ZHIING manager has been widely distributed.

Once the ZHIING manager has been downloaded on the receiving device 108, it will be able to open a communication channel with the application server to receive location identifiers corresponding to the target address and directions to that target address. As previously note, the presently preferred underlying transport mechanism for initiating the transfer of data from the application server 106 to the receiving device 108 is text messaging, and in particular SMS messaging, although MMS for some other messaging platform now existing or later developed could be equally utilized. However, the receiving user will not see the ZHIING message as text (except for the first message they receive which instructs them to download the ZHIING manager, and unless restricted by the platform of the receiving device, as is presently the case with the IPHONE). Rather, the ZHIING manager will intercept the text message and process the message to remove the text and process any data contained therein, as further described below.

When the ZHIING manager is being installed on the receiving device 108, it will also check to see if appropriate map libraries have been installed on the receiving device already, and if not, will prompt the user to install them. Appropriate mapping software (such as GOOGLE maps software or BLACKBERRY maps software) and associated libraries vary depending on the receiving device 108. Upon installation, the ZHIING manager will configure the text processing application interface and the mapping application interface, add a quick launch icon for the ZHIING manager on the receiving device's main screen, and send a request to the application server 106 to send any unread ZHIING messages, including the original ZHIING message, so they can be processed by the ZHIING manager.

Also during installation, the ZHIING manager will be configured to be the text message interceptor application. This enables the ZHIING manager to check each incoming text message to determine if it is really a text message or a ZHIING message. ZHIING messages are retained by the ZHIING manager and text messages are sent to a message queue for the text messaging application. ZHIING messages are identified by a unique prompt or code that is included in each message that would never appear in any other text message, under normal circumstances. This intercept function is possible because the operating system of most hand-held devices is configured to pass on messages received by the devices to a specific application that processes such messages. The operating system will post the message to a message queue associated with that application. For example, text messages, such as SMS messages, would typically be posted to the message queue associated with the SMS processing application. To intercept such messages, the ZHIING manager installation procedure reconfigures the receiving device's operating system to post all SMS messages to the message queue associated with the ZHIING manager. The ZHIING manager can then check each message to see if it includes the prompt, and if not, send the text message back to the SMS application for normal processing.

The ZHIING manager can be installed and operated on any of a large number of mobile devices, although each device may require a different implementation in order to account for differences between how the devices operate. Overall, however, the basic functionality of the ZHIING manager is the same regardless of the receiving device on which it was installed. For example, the ZHIING manager should always be able to create and send ZHIING messages, store ZHIING messages that it has sent (an "OUTBOX" or "SENT" folder), receive and store ZHIING messages sent to it (an "INBOX" folder), view messages sent along with a ZHIING message, and generate directions and messages in response to received ZHIING messages. Other features, such as forwarding ZHIING messages or automatically resending ZHIING messages that did not go through on a prior send command, could also be implemented.

As previously noted, once installed, the ZHIING manager is preferably launched upon receipt of a ZHIING message. In the event the operating system of a mobile device prevents the ZHIING manager from being launched upon receipt of a ZHIING message, once a ZHIING message is received, the user is notified so the user can launch the ZHIING manager. Once the ZHIING manager is invoked, the ZHIING manager downloads all of the ZHIING messages that have been received since the ZHIING manager was last launched (the delta ZHIING messages) and alerts the user about all of the newly received ZHIING messages. At this point, the user has the option of viewing the different ZHIING messages to choose one or more to open or to store.

If the user opens a ZHIING message, appropriate content from that ZHIING message (such as the FROM identification, the SUBJECT, the DESTINATION and any MESSAGE) will be displayed to the user, along with an option to view the route map to the target location. Once the user opts to view the route map, the mapping or navigation application software will be automatically launched on the receiving device 108 to display a route on a map starting at the receiving device's current geographic location and ending at the geographic location of the target location sent in the ZHIING message. As an alternative, the user could be presented with written directions from the starting point to the ending, or in addition to the map, and could be presented with spoken directions, if their receiving device 108 is so enabled.

When a ZHIING message is received, once the ZHIING manager is installed, the ZHIING manager will open a communication channel with the application server to receive data associated with the ZHIING message. This data is not contained within the ZHIING message itself For example, upon receipt of the ZHIING message, the ZHIING manager would open a channel with the application server over the Internet (including through a voice channel in the case of a mobile phone or GPRS device) and send an HTTP request. The HTTP request lets the application server know that the ZHIING message was received and that the receiving device is ready to receive data. The application server would respond with an HTTP response that provides all of the data, such as the geographical coordinate information for the target location, as well as any sending information, the subject, the message, etc. Once the receiving device has received the data, it will inform the application server and the channel will be closed.

The ZHIING manager will then insert the geographic location information into a coordinate queue, while inserting the other incoming data into the ZHIING manager's application queue. The ZHIING manager maintains a separate queue of geographical coordinate information that corresponds to each ZHIING message. There is a one-to-one mapping between the coordinate queue and the application queue. The coordinate queue is required to segregate the geographical coordinate information from the rest of the information associated with the ZHIING message, which can be presented to the user by the ZHIING manager. As ZHIING messages are received, the user is alerted and presented with the option to view the data associated with each ZHIING message, navigate to the target location, as already described above, or store data associated with the ZHIING message. Although the ZHIING manager is really storing or viewing or forwarding the data associated with a ZHIING message, rather than the message itself, to simplify the present description and the functions described in many of the claims herein, the present disclosure refers to the message in place of the data when describing and claiming the process of handling the data associated with each ZHIING message. Hence, if the user chooses to store a ZHIING message, the ZHIING manager will retain the data associated with the ZHIING message in the application queue, retain the geographical coordinate information in the coordinate queue, and place the data associated with the ZHIING message in the INBOX as an "unread" message.

Although the ZHIING manager is necessary to receive a ZHIING message, it can also be used to reply to a ZHIING message, perform a reverse ZHIING request, and send a ZHIING request, in a manner similar to the sending device 102. A receiving device replies to a ZHIING message by replying back to the application server with the geocode or geographic location of the receiving device, which is then returned to the sending device in the same manner that a ZHIING message is sent. The user of the receiving device could also reply to any message that might be contained in the originally ZHIING message. A reverse ZHIING request involves the sending device requesting the geographic location of the receiving device, instead of sending a target address to the receiving device. Thus, like a reply, the receiving device would determine its geographic location and send that back to the sending device, which could either go to the sending device indirectly through the application server or directly back to the sending device without going through the application server.

Figure 6:
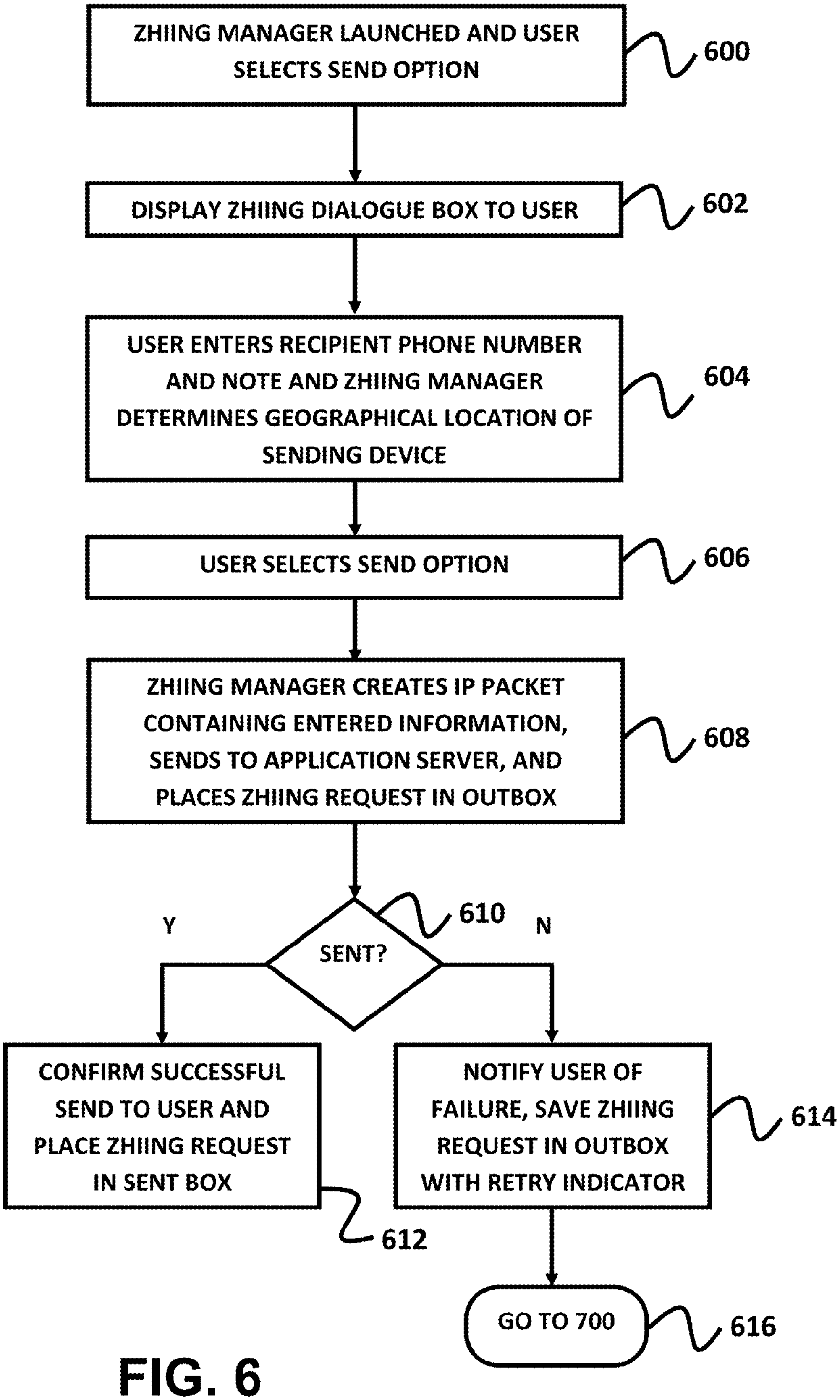
FIG. 6 is a flow diagram illustrating the operation of the ZHIING manager.

FIG. 6 illustrates how the ZHIING manager sends a request. The ZHIING request can take two forms: one essentially identical to using the ZHIING applet, where the user highlights an address within a web page being browsed by the user on the sending device (when mobile device browsers become so capable), or by manually entering an address; and one that uses the geographic location of the sending device in place of an address. Since the first form has already been discussed above, the second form will now be discussed.

To send a ZHIING request including the sender's location (such as when the user wants a friend or someone else to be able to find them), the user would launch the ZHIING manager on the sending device (in this case, a mobile device equipped with a location identification service) and select the option for sending a ZHIING request from the ZHIING manager's user interface, block 600. The ZHIING manager would then open a window or dialogue box on the display of the sending device, like dialogue box 300 (but without the destination box 302, since that will be just the longitude and latitude of the sending device), block 602. As with dialogue box 300, the user would then enter the phone number for the receiving device, or select a phone number from a menu of addresses or from an address book or contact list available on the sending device, while the ZHIING manager determines the geographical location of the sending device for entry into the ZHIING request. Preferably, the sending device's phone number will be automatically filled in, block 604.

Once the dialogue box has been filled in, the user would select the send option, block 606. The ZHIING manager would then create an IP packet or HTTP request containing the ZHIING request and send the ZHIING request to the application server 106. The ZHIING manager would also put a copy of the ZHIING request in the OUTBOX with an indication that the request is being processed, block 608. Since the network accessibility and connectivity of mobile devices varies, the ZHIING manager would check to see if the ZHIING request was successfully sent, block 610. If the ZHIING request was successfully sent, the successful send would be confirmed to the user and the ZHIING request would be moved from the OUTBOX to the SENT box, block 612. If the ZHIING request could not be sent for some reason, the user would be notified and the ZHIING request would be saved in the OUTBOX with a retry indicator, block 614. The ZHIING manager would then move to the retry process, block 616.

Figure 7:
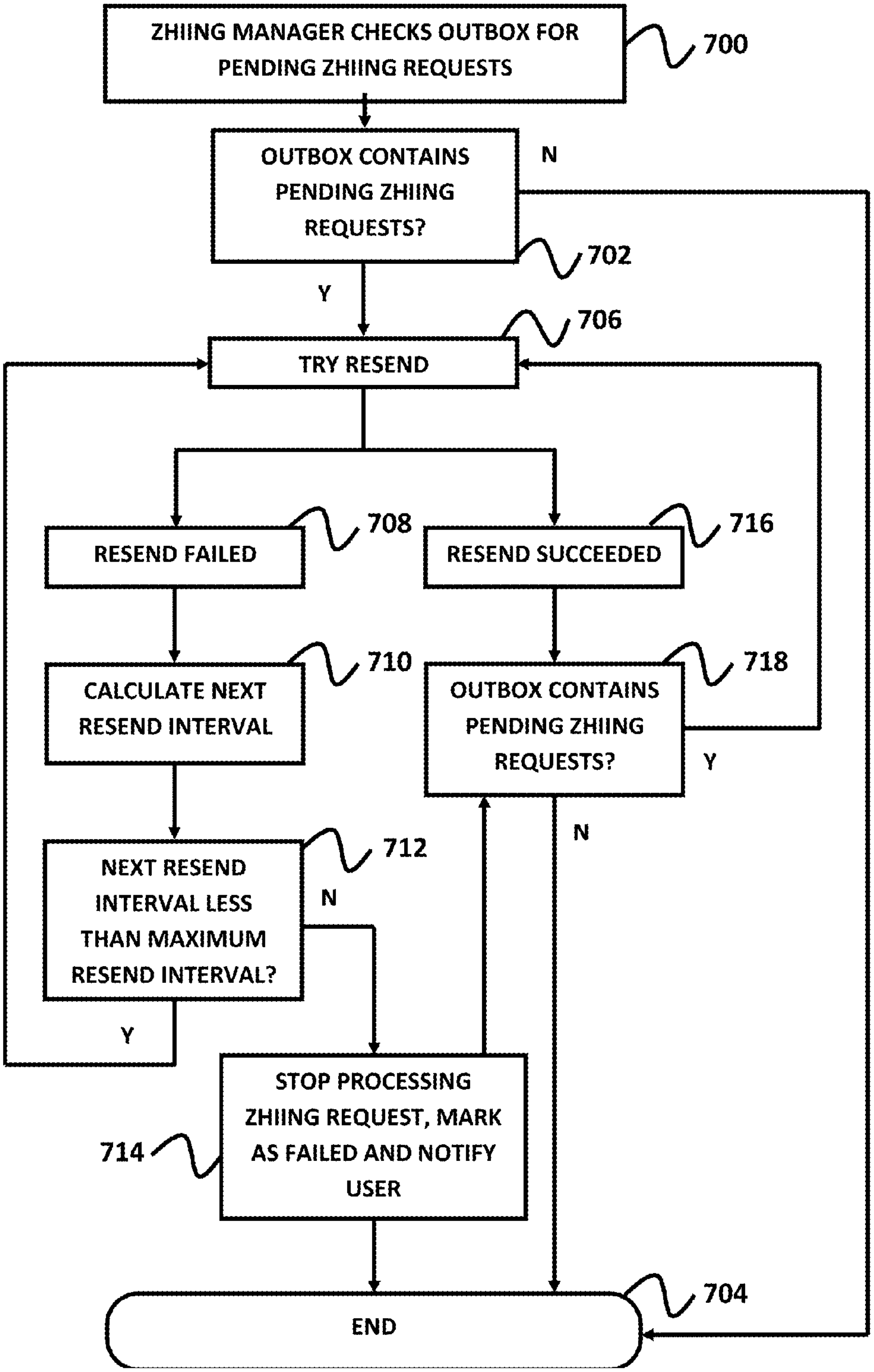
FIG. 7 is a flow diagram continuing the illustration of FIG. 6.

The retry process is illustrated in FIG. 7. The ZHIING manager will check the OUTBOX after some predetermined period of time looking for ZHIING requests that are still pending (the ZHIING request would have been sent to the SENT box if it was not pending), block 700. If there is no pending request, block 702, the retry process terminates, block 704. If a pending request is present, block 702, the ZHIING manager will attempt to resend it again, block 706. If the second attempt to send the request fails, block 708, the ZHIING manager will calculate a resend interval, block 710. If that resend interval is anything less than the maximum resend interval (which may be determined by the service provider network 112, the operating system of the sending device, or some other factors), the ZHIING manager will attempt to resend the ZHIING request again, block 712. If the resend interval has been or will be exceeded, then the ZHIING manager will stop processing the ZHIING request, mark the ZHIING request as failed, and notify the user accordingly, block 714. If the resend is successful at any point in the retry process, block 716, the ZHIING manager will move the ZHIING request to the SENT box and then check to see if there are any other pending requests in the OUTBOX, block 718.

Figure 8:
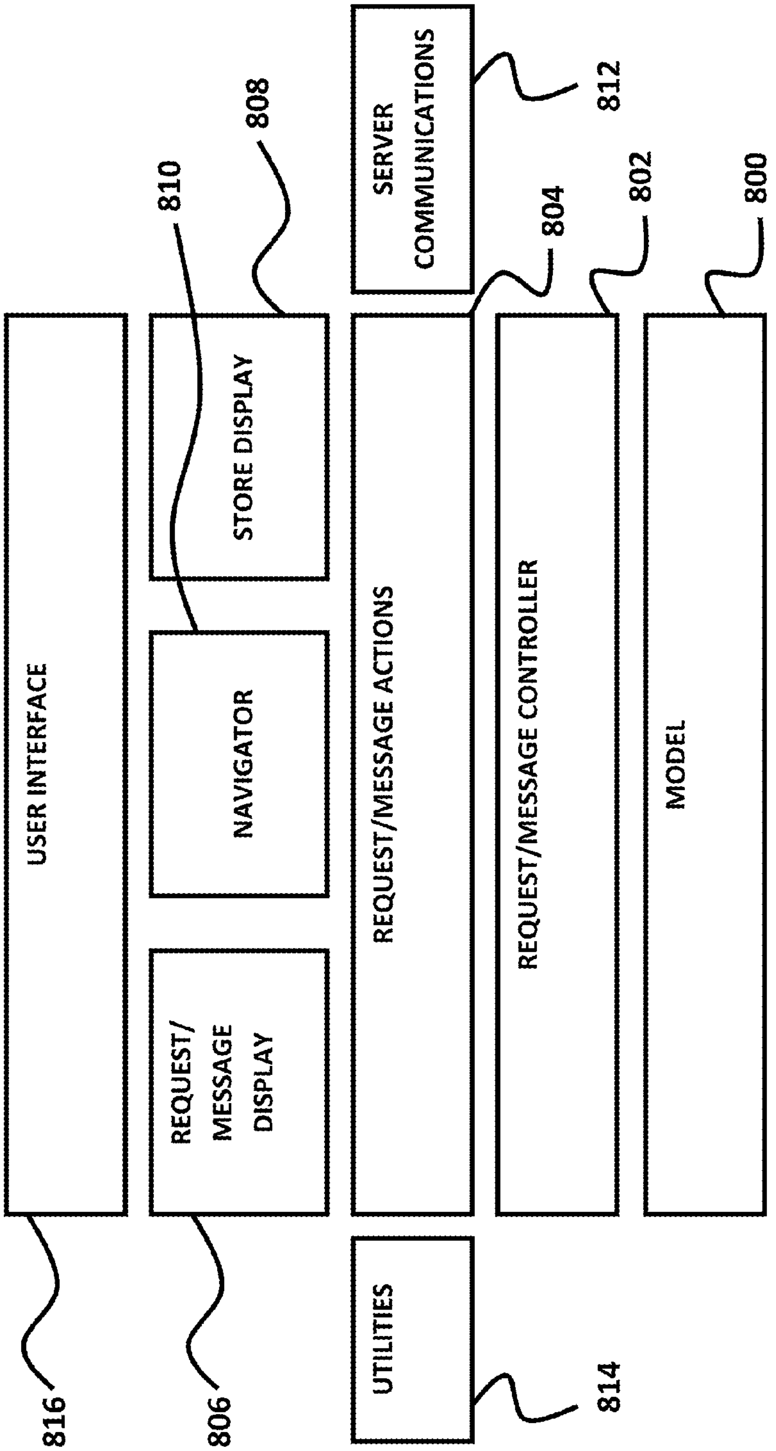
FIG. 8 illustrates a high level architecture of a ZHIING manager in accordance with an embodiment.

An exemplary system architecture for a ZHIING manager, as implemented by various object oriented component modules within an APPLE IPHONE, is illustrated in FIG. 8. The model layer 800 includes the various classes (the characteristics and behaviors of different objects) that represent the ZHIING request/message and the request/message aggregator. The model controller layer 802 includes the class that would manage the request/message aggregators. Model controller 802 is also the entry point to the model 800. The request/message actions layer 804 contains the classes that would deal with the actions related to a request/message, such as send, forward, read, resend, and view map/directions. The request/message display layer 806 contains the set of classes that display the request/message and the options associated with it. The store display layer 808 displays the request message stores (i.e., INBOX, OUTBOX AND SENT box). The navigator layer 810 enables navigation between the different views (the main display, various message stores, dialogue box, etc.). The server communication layer 812 interfaces with the IPHONE's communication network and handles interaction with the ZHIING application server 106. The utilities layer 814 provides services that are utilized by the other component modules, such as converting a ZHIING message into XML format, finding the IPHONE's geographic location, or accessing the mapping application. The User Interface 816 enables user interaction with the ZHIING manager.

In accordance with the present disclosure, the INBOX of the ZHIING manager lists all of the receiving ZHIING messages that have been saved by the user. ZHIING messages that have not been opened are indicated as being "unread". The SENT box lists all of the sent ZHIING requests that have been saved by the user. The OUTBOX lists all of the ZHIING messages that are in the process of being sent or could not be sent and are subject to retry or have failed. Within each box, the user has the ability to navigate through the different requests/messages, open requests/messages, and perform other functions, such as delete, resend, stop a resend, etc.

An embodiment is directed to a method for managing a geo-targeted campaign or event. A user defines an event by specifying a set of triggers, a set of triggering devices, a set of action recipient devices, and a set of actions performed as a result of the triggers firing. Actions associated with triggers can include delivering a message to the recipient device, performing a function on the recipient device, or performing a function on a third party system. Events can be defined through a console. The console provides a user interface with controls enabling users to manage campaigns and events, define devices and landmarks associated with events, monitor and track location and other sensor data from a plurality of devices, etc. The console includes a wizard for creating events using step-by-step screens, and a visualization layer that allows a user to visualize devices and landmarks on a map.

The console can be implemented as a desktop application, a mobile application, a web based application, a tablet application, etc. The console can also be implemented as a standalone application or as a plug-in for third party systems. Regardless of the console implementation, embodiments may restrict access to the console with a secured login. After a user has logged in, the application provides the user with options for creating a new console, selecting a console created by another user, or selecting a previously created console. For example, a user may use a first console to manage activities within a first city, and a second console to manage activities within a second city. The first console and/or second console may have been created by the user, or by a third party who assigned permissions to the user to access/edit the first console and/or the second console.

An administrator can manage consoles for one or more third parties. For instance, an administrator can manage a first console for a first company and a second console for a second company. Consoles can also be used by parents to manage personal events, family events, and business/work related events. If the school of the parent's children also uses consoles for managing school events, the school may provide the parent with viewing access, editing access, restricted access, etc. In this case, the school officials may set privacy settings associated with the school console, where school officials are allowed to create events, and parents of students are allowed to view events but not allowed to edit events or to view personal information associated with the student body.

As described herein, "console" refers to the user interface enabling a user to manage events and visualize data associated with events. As noted above, a user can create consoles from scratch or can have access to consoles created by another user or by a third party. For instance, an administrator user can initially create different consoles for customers having different needs. This initial creation process may consist of assigning a name to the new console, loading graphics associated with the customer (such as the customer's logo or brand), customizing the look and feel of the console according to the customer's requirements, loading an initial set of devices, creating one or more initial landmarks, creating one or more initial events, creating one or more demos of landmarks and events for the customer's future reference, and assigning other default settings based on the customer's requirements. Thus, embodiments described herein include methods for creating and customizing a console for use by a third party.

As an example of the uses of the console described herein, a console can be used to manage events associated with various terminals in an airport. Once the console was created and initially configured, the console can be used by officials of the LAX airport to create events, load devices, define landmarks associated with various terminals, track devices given to employees, etc. Similarly, a console used by the owner of a restaurant or a franchise, can use the console to create events associated with the restaurant or franchise.

A console can be created by an administrator who customizes and initially configures a console in accordance with the requirements of a third party. Alternatively, a console can be created by an end-user the first time the user attempts to access the console. During the initial creation process, the system can load a default console with a standard set of settings. Alternatively, the system can present a new console wizard that guides the user through a set of screens designed to enable the end-user to create and configure a new console that meets the end-user's needs. The wizard may include screens for assigning a name to the new console, for specifying one or more locations (such as a city or a neighborhood) to be associated with the console, for loading one or more graphics and logos, for loading one or more devices managed by the user, and to specify other settings.

Figure 9:
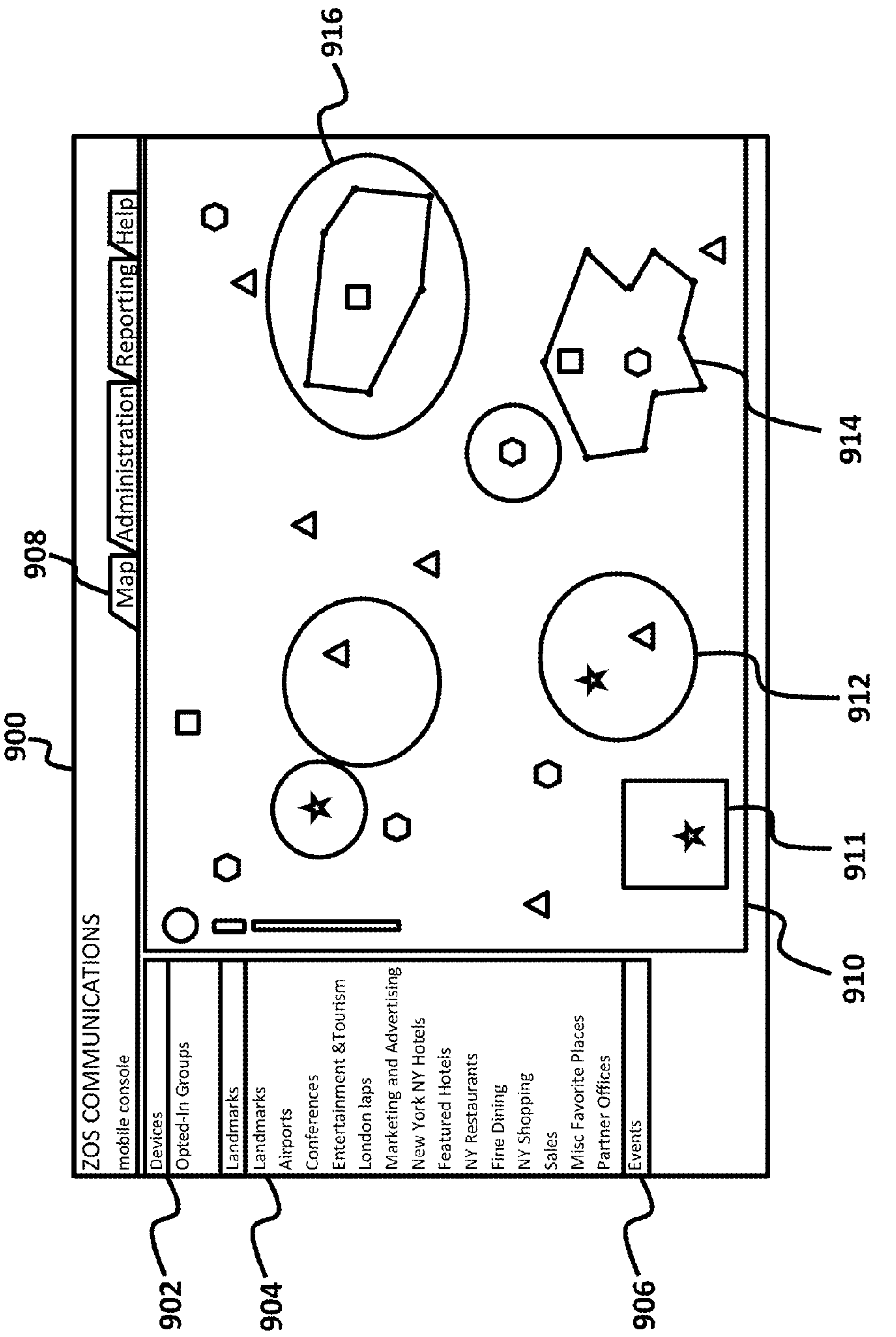
FIG. 9 illustrates the console interface for creating and editing a geo-marketed in accordance with an embodiment.

FIG. 9 illustrates an embodiment of a console 900. The console 900 includes devices panel 902, landmarks panel 904, and events panel 906 on the left side of the console interface. In particular, FIG. 9 shows the console interface when the map tab 908 is selected. The console interface may further include an administration tab, a reporting tab, and a help tab. The administrator tab provides options for setting the time zone, a message editor for creating messages delivered to action recipient devices, and controls for managing attributes associated with devices managed by the console. The administration tab also includes controls for uploading a plurality of devices from an external source, for uploading landmarks defined on an external source, and uploading and customization of images that can be used as icons devices, landmarks, and events. By providing the options for uploading images the console further provides the means for enabling a user of the console to customize the look and feel of the console by uploading logo and other images associated with the user.

Attributes, which act like labels or filters, can be assigned to devices in order to more precisely define the collection of devices that trigger an event or are the recipient of event action processing. Attributes can also be used to filter functionality to devices associated with that attribute. For instance, the number of times a particular device has fired a trigger can be tracked with an attribute associated with the device. Similarly, the type of the device can be an attribute added to devices.

The reporting tab provides options for viewing and generating reports associated with activity tracked by the console. Reports can be generated for individual devices and a group of devices. Reports can include data associated with activity within landmarks. The reporting tab can also enable the user to view reports associated with triggers and generate reports for activity associated with events.

The console 900 includes a map 910, which displays devices on the field and landmarks. Different icons can be used to represent different devices, allowing for the map to quickly and efficiently convey a large amount of information. For instance, within map 910 the square icons represent devices, the star icons represent shopping areas, and the hexagon icons represent restaurants. As noted above, the icons used for a particular device or landmark can be customized by the user. Devices represent any type of device, including a mobile device, a machine-to-machine device, a laptop computer, a desktop computer, a tablet computer, a smartphone, a wireless enabled device, a device with GPS, a device with AGPS, or any other location aware device.

The map 910 includes various types of landmarks, including rectangular landmarks 911, circular landmarks 912, and freeform landmarks 914. Freeform landmarks 914 can be created by manually drawing the freeform shape. Map 910 also includes an example of a layered landmark 916, where a first landmark (a freeform landmark) is located inside of a larger landmark (circular landmark). As noted above, a landmark can be defined by one or more overlapping areas or one or more disjoint areas. For instance, a user can define a landmark consisting of area 912 and area 914. Therefore, landmarks can represent any geographical space, including a single coordinate point, an indoor area, an outdoor area, a building, a room within a building, or any combination of these.

Alternative embodiments of the console can provide alternative visualization layers in addition to the map. For example, devices and their current location can be presented in a list or a table. Within the list or table, devices belonging to different groups can be displayed using different font colors or by being highlighted with different colors. A three dimensional (3D) map or an alternative graphical representation can also be used in embodiments of the console.

The map, or the alternative visualization layer, can also integrate a third party mapping service application, such as GOOGLE MAPS, YAHOO MAPS, BING MAPS, MAPQUEST, among others. Functionality provided by a mapping service application typically includes the ability to pan the map, zoom in and zoom out of sections in the map, display the map using different layers (such as terrain, satellite, map, and hybrid), and display additional information on the layers (such as traffic, transportation, and terrain). The actual mapping service application used can be selected by the user from a list of available mapping service applications or by integrating an alternative mapping service application using the console's API. For instance, the user can be presented with popular mapping service applications, with the user having the ability to select and change the mapping service application at any time.

Events define actions performed in response to triggers. Events are defined by parameters, such as: (1) Which devices trigger an action to occur? (2) Who is the recipient of the action? (3) What locations, defined by landmarks, are associated with triggers? (4) Is the action targeted to users traveling at a certain speed (i.e., walking or riding in an automobile)? (5) What is the schedule and duration for the action? (6) What action will occur?

Events can be defined using various methods. For example, an event can be defined by selecting a trigger, setting the trigger properties, selecting devices which can cause the trigger to fire, choosing an action to perform when a trigger fires, and selecting devices that are recipients of the action. Action behavior can also be controlled by setting various action properties. For example, action execution can be configured to occur every time a trigger is fired, only once per device, only once per time period, or any combination of these.

In further reference to FIG. 9, the devices panel 902 lists all of the devices managed by the console. The devices can be loaded from a file, from a database, from a third party file, from a third party database, or from an alternative third party source. Once loaded, the devices can be organized into groups and subgroups. If the source from which the devices are being loaded includes group information, then the devices loaded can be automatically formed into groups and subgroups according to the information from the source.

When loading a plurality of devices from an external source, the information on the external source preferably is organized in a specific order enabling the console to effectively parse the information in the file. For example, the order of the information can be (1) group name, (2) device identifier, and (3) device display name. However, it is to be understood that any other order, or the use of alternative fields, is possible without departing from the spirit of the disclosure. The format of the file containing the plurality of devices can be CSV, tab-delimited, XML, YAML, raw text, etc. If needed, the console can support add-ins or plug-ins to read a custom format or to read data organized in a different fashion.

The devices panel 902 allows for individual devices and for groups of devices to be defined manually. Device groups can be nested to form device subgroups, and individual devices can belong to more than one device group/subgroup. Devices need not be organized using groups and subgroups, and any group or subgroup can consist of a combination of groups and devices. Devices can be grouped together to facilitate their management and to facilitate their association with triggers and actions.

When creating device groups, the console displays a dialog including fields for specifying the properties of the device group. The fields in the dialog can include a group name, an icon to use for the device group, a description of the device group, and global properties and attributes to apply to devices that are members of the device group. The dialog can also include options for indicating the devices that are to be part of the device group or to load the one or more devices to the device group from an external source. After a device group has been created, the properties of the group can be edited through the devices panel 902.

When adding a device manually, the console displays a dialog allowing the user to enter a device group name, a unique identifier for the device (depending on the type of device), the type of the device, additional identifiers for the device, a name for the user of the device, additional contact information of the user of the device, a display name for the device, an icon to display for the device on the map, among other options. It is to be understood that when creating a device or a group manually, a user need not fill out all of the fields for the console to operate correctly. For instance, for a device it may only be necessary for the user to fill out the unique identifier of the device while leaving all other fields blank.

The unique identifier of a device can depend on the type of the device. When adding a device to the devices panel, the console may prompt the user to enter the unique identifier of the device, allowing the console to automatically determine the type of the device by querying the device. Alternatively, the console may prompt the user to enter both the unique identifier of the device and select the type of the device from a list of available device types. The console may also first prompt the user to enter the type of the device, and based on the type of the device prompt the user to enter a corresponding identifier. For instance, in the case of a mobile device or a smartphone, the unique identifier may be the phone number associated with the mobile device or smartphone. In the case of a laptop, a table computer, or a desktop computer, the unique identifier may be the MAC address or the IP address of the device. The type of the device can also be used to determine the types of triggers that can be fired by the device and the types of actions that can be performed on the device.

In one embodiment, the console can interface with a database of devices, with the unique identifier consisting of an identifier assigned to the device in the database. For instance, if the console is being used by a manager in a company, then the database can include devices distributed to employees of the company. The manager could then enter the name of a particular employee, with the console automatically searching in the company database for the device assigned to the particular employee.

The console can also receive the unique identifier of a device, establish a connection with the device using the unique identifier, and assign yet another identifier to the device. For example, a user may enter a phone number for a device. The console may then query the device using the phone number, and assign another identifier to the device. The console can then track the device using the other identifier of the device. Such an embodiment enables the alternative identifiers of devices to be displayed on the map of the console, thus protecting the privacy of the users of the devices.

Once a device has been added to the devices panel 902, the console 900 can be used to control how often the device provides location updates, and how often the corresponding information is updated on the map 910 of the console 900. The location can be updated on a regular interval, or the location can be updated when the user manually requests a location update through the console. The interval for automatically refreshing the locations of the devices in the map can be configured by the user.

Embodiments disclosed herein can include an opt-in mechanism for devices. For instance, if a console user adds the device owned by User A, then User A may receive on the device a message asking User A whether he/she accepts the request sent from the console user. At this point, User A can accept the request or decline the request. If User A accepts the request, User A may receive on his/her device an application download allowing communication with the console and/or with a location platform. Alternatively, User A may receive on his/her device an update to the device's software or firmware that allows the device of User A to seamlessly communicate with the console and/or with a location platform. The download or application can consist of a discrete agent service, with the discrete agent service monitoring and managing the location of the device of User A, gathering sensor data communicated to the console and/or the location platform, and executing actions on the device of User A in response to action messages or action notifications received from the console and/or the location platform.

The opt-in mechanism is optional, as alternative embodiments may comprise of the device of a user receiving automatically, with or without notification to the user, an application download, updates, or the discrete agent service. Devices can also already include the application, service, or discrete agent service necessary for communication with the console and/or location platform prior to being distributed to users. For example, an employer may distribute devices to employees, with the devices having been previously configured to automatically communicate to the console or location platform managed by the employer. Similarly, a parent can configure and install the necessary application or service to enable the devices given to children to communicate data to the console or location platform managed by the parent. The opt-in mechanism and the automatic communication of location and sensor data from devices to the console can also be controlled based on permissions and policies set on the device, permissions and policies set by a third party, or permission and policies set through the console.

Embodiments further enable the console to mask information associated with devices based on privacy and access settings associated with the device and privacy and access settings associated with the console. For example, the owner of a restaurant may create a campaign to send coupons to users whenever users are within a specific distance from the restaurant. The console may then provide the restaurant owner or the restaurant manager with a log of the number of coupons that were distributed, the locations of users when they received the coupons, the number of coupons redeemed, the actual speed of the device when the coupon was delivered, etc. However, the console may restrict the type and amount of data displayed in order to protect the privacy of the users receiving the coupons. In such a case, the console may simply display the location and time when a user received a coupon, but may not indicate any personal information associated with the user of the device, such as the device's phone number, the user's name, etc.

An administrator of a console can also customize a level of control provided to one or more other console users. That is, the console can allow a first user to perform a first set of functions, allow a second user to perform a second set of functions, where the first set of functions and the second set of functions are a subset of the total functions provided by the console. For instance, the administrator may allow a first user to have permissions to load devices, but not permissions to edit landmarks or create events. A second user may have permissions to create events, but not permissions to edit the landmarks or the list of devices, etc. The permissions can also determine the type of information that can be viewed by a particular console user. For instance, a user may have permissions to create events, and may have permissions to view the landmarks, but may not have permissions to view the list of devices. In such a case, a summary of the list of devices may be presented to the user, thus hiding any personal information associated with an individual device. The console may also hide and mask information by displaying devices based on demographics, rather than displaying identifying information associated with an individual device.

Once a device has been loaded to the console 900, the location of the device can be viewed on the map 910 by selecting the device from the devices panel 902. The devices which are displayed or hidden from view can be toggled via the tree control of the devices panel 902. Thus, if device group on the devices panel 902 is selected, then all of the devices belonging to the device group are displayed within the map 910 of the console. The user can also unselect a particular device in the devices panel 902 if it was not desired to display the location of that particular device on map 910. A user can also select a device displayed on the map 910 in order to display additional information associated with the device. The additional information can be displayed on a side panel, on a dialog window, or on a bubble. Selecting a device also enables the editing of properties associated with the selected device.

Embodiments of the console 900 enable the customization of icons displayed for devices on the map 910. The icon can be selected from a plurality of default icons, or an icon can loaded from an icon file or an image file. Associating different icons with different devices or different device groups, enables a user to quickly identify the type of a device and other information associated with the device by simply glancing at the map 910.

The landmarks panel 904 lists existing landmarks using a tree structure. Landmarks can be organized into landmark groups and landmark subgroups, similar to how devices are organized into device groups and subgroups. When adding a landmark, a user can specify the group name to which the landmark belongs, a name for the landmark, a description associated with a landmark, etc. Landmarks displayed on map 910 can be toggled on and off by selecting the corresponding landmarks listed in the landmarks panel 904.

The console 904 provides several controls for drawing a landmark. The landmark can be drawn manually by selecting various points defining the outline of the landmark. For instance, if a user wanted to draw a triangular landmark, the user can select the three points within the map 910 that define a triangular outline. A user can draw any polygonal landmark, either concave or convex, simply by selecting with the mouse the vertices of the desired polygonal shape. In one embodiment, line segments are progressively drawn as the user draws each vertex, enabling the user to see the current shape outline as the user makes point selections.

Figure 10:
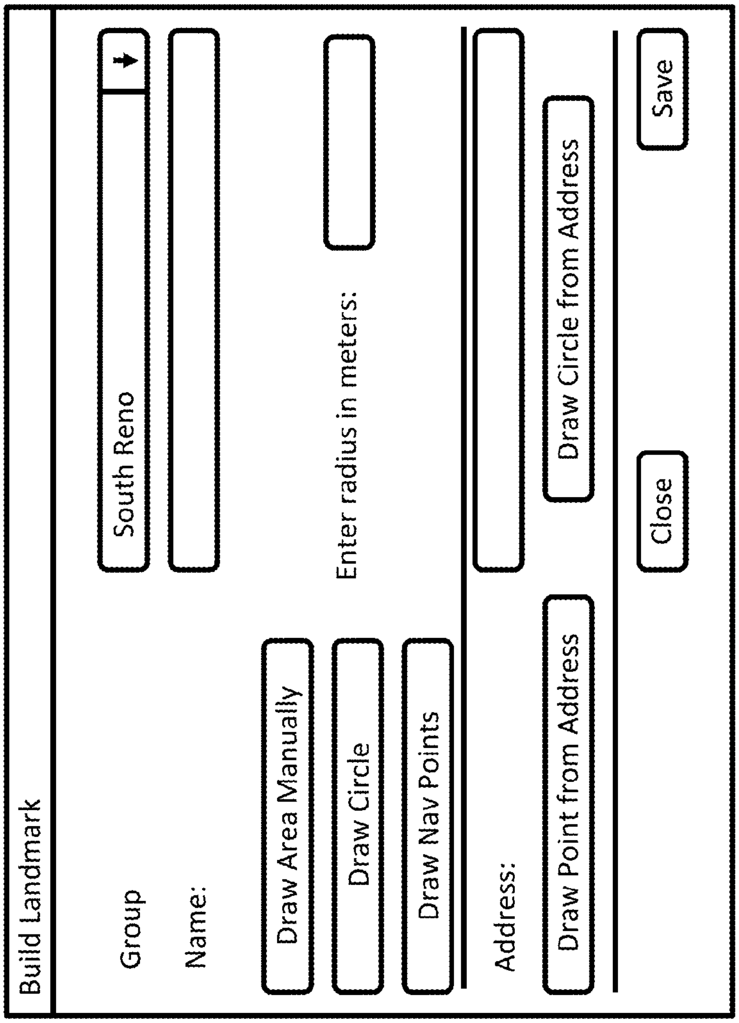
FIG. 10 illustrates a dialog window of the console that provides controls for drawing a landmark in accordance with an embodiment.

FIG. 10 illustrates an example dialog window displayed during the landmark creation process. The dialog includes options for specifying the landmark group and the landmark name. Drawing options include drawing the area manually by selecting within map 910 the outline of the landmark, drawing a circle around a point manually selected by the user, drawing a point from an address, and drawing a circle around an address. The dialog screen can also include options for loading a shape from a file or loading a shape from a live feed.

A landmark can also be drawn by simply selecting a single point in a map. After a single point has been selected, the user can choose to draw a circle around the selected point by using the mouse (or alternative input device) or by specifying the radius of the circle (centered on the single point). The user can also specify an exact address, and subsequently draw a point from the exact address, draw a circle or draw some other shape around the address point.

In an embodiment, the console enables a user to select one out of a plurality of predefined shapes to draw around a point selected by the user. For instance, the predefined shapes can include squares, rectangles, diamonds, pentagons, or any other polygonal shape or freeform shape. After the predefined shape is drawn, the user can scale the predefined shape up or down, or rotate the predefined shape. The predefined shape can also be edited by moving one or more points on the shape's outline or by deleting a point from the outline of the predefined shape. The landmark can also be edited by adding vertices, deleting vertices, or splitting the drawn area into two areas.

In one embodiment, the landmark creation process can be completed with a wizard tool, with the wizard tool providing a series of screens guiding the user through the necessary steps for creating landmarks. For instance, the first screen can prompt the user to select an existing landmark for editing, or create a new landmark. The second screen may provide drawing options as described above, and so on.

Landmarks can be loaded to the console from an external source, such as a file, a database, or a third party external source. Each landmark can be defined with a list of coordinates, where each coordinate from the list of coordinates defines a point forming the outline of the landmark. The landmarks may also be defined with an image file or by using the console's API for drawing landmarks. When loading landmarks from an external source, the landmarks can be defined using any one of available data serialization formats, including comma-separated values, JSON, XML, YAML, raw text, etc. Landmark information can also be received from a live feed from a remote location, enabling the shape of the landmark, the position of the landmark, and other landmark information to be updated automatically from the live feed.

One embodiment of the console can also enable the user to specify one more points of interest within the landmark, and navigation points to the one or more points of interest. Thus, if an existing mapping service application does not include sufficient data for determining navigation instructions to a specific landmark, the navigation points defined through the console can be used to provide navigation instructions to the points of interest within the landmark. The navigation points associated with the landmark can also be combined with the navigation data received from a mapping service application. For instance, if the area is a university campus, drawing the navigation points would allow the user to define the specific path that can be followed by a walking user (rather than being restricted to navigation instructions for a vehicle) to be followed to get to a specific building, restaurant, room, or event within the campus. The navigation points for the campus can then be pieced together with any navigation instructions provided by the third party mapping service. This is especially useful for providing navigation points to areas for which navigation instructions are not available from third party mapping applications. The navigation points can also be used to define a walking paths, biking paths, define evacuation routes for the landmark, etc. These routes and/or paths can be communicated to a third party routing system or to devices in the field. For example, if a console user receives information about a high-risk area, such as a fire, a blast site, a riot, a plume cloud, etc., the console user can define the high-risk area as a landmark and define an evacuation event. The user can create an event which delivers messages to users that come within proximity of the high risk area, with the message delivered including information about the high-risk area and a route that avoids the high-risk area.

The events panel 906 allows a user to define a geo-targeted event or a campaign. Events define actions to perform when a trigger fires. The triggers can be fired by devices, by third party systems, or based on other contextual information. A simple event can consist of a trigger that fires based on a set of conditions associated with a device. The trigger firing results in an action, with the action recipient being the triggering device, a different device, or a third party system. An event can be associated with a geo-fence, defined by a landmark, but this is not necessary to define events. Events can also be manually activated and deactivated, or a schedule can define when the event begins and ends. When editing the schedule associated with an event, the console provides options for specifying the start date of the event and the end date of the event. Further controls can include enabling the event during particular days of the week and during particular times of day. The setting of the event schedule, the triggering of actions during the scheduled times and dates and times, and the delivery of content, can be performed autonomously from the carrier network of the triggering and recipient devices. In one embodiment, the events panel 906 can provide controls for copying events, enabling a user to create a different event by modifying existing events. The events panel 906 can also be used to enable and disable events and to organize events into event groups and subgroups.

In one embodiment, the console includes an event wizard tool that guides users through the various steps needed to create an event. For example, the wizard tool can prompt the user to select devices that may trigger the event, select action recipient devices, select triggers associated with the event, select a landmark associated with the event, and select the action performed when triggers fire. The screens and the options presented within each screen of the wizard tool can depend on the selections made by the user on previous screens. For example, the wizard tool may first prompt the user to provide a name for the event and a description of the event. The next screen may prompt the user to select a desired trigger. Depending on which trigger is selected by the user, the next screen may display options associated with the trigger selected by the user. If the user selects more than one trigger to be associated with an event, then the next screen may display the options for each of the triggers separately. Alternatively, the next screen may display the options for the first trigger, and the following screen may display the options for the second trigger, and so on.

It is to be understood that while the creation of an event and the event wizard tool is described in terms of a sequence of steps, the order of these steps can be varied without departing from the spirit of the disclosure. In addition, additional steps can be added and omitted without departing from the spirit of the disclosure.

Triggers include, but are not limited to, entering an area, exiting an area, being in an area, being outside of an area, proximity to another device, speed, and triggers set by a third party system. Other triggers are discussed further in detail below. For triggers associated with a landmark (entering an area, exiting an area, being in an area, and being outside of an area), the console provides options for selecting an existing landmark or allowing the user to manually draw a landmark associated with the trigger. For the speed trigger, the console provides options for specifying the target speed and to specify whether the event is triggered when a speed is greater than or less than the target speed. The options for the proximity to another device trigger include the unique identifier of the other device and the proximity distance, while the proximity to a landmark trigger includes the selection of the landmark and the proximity distance. Embodiments of the proximity-based triggers can be deployed without the need for third party mapping data.

The in area and out of area triggers can be used to define events associated with a user of the device being in the area at a particular point in time or being out of the area at a particular point in time. This can also include conditions such as the user of the device having a residential address in an area or out of an area, whether the user of the device has a work address in an area or out of an area, whether the user of the device attends school in an area or out of an area, etc.

With FIG. 9 as a reference, the triggers associated with areas or geo-fences can be explained. For instance, if an event is defined by landmark 914, then the enter area trigger would fire whenever a device enters landmark 914. The exit area trigger would figure whenever a device exits landmark 914. Similarly, the in area and out of area triggers would fire respectively if the device is located inside of the landmark 914, if the device is outside of the landmark 914, if the user of the device has a residential or some other personal address in landmark 914, if the user of the device has a work or some other address in landmark 914, etc. Finally, the proximity trigger would fire whenever a device is within a proximity distance from the landmark 914, within a proximity distance from one or more points within the landmark 914, or within a proximity distance from another device whenever the device is in the landmark 914 or outside of the landmark 914.

When creating an event, the console further provides options for selecting the triggering devices. The triggering devices can be selected from the devices displayed on the map, from the devices listed on the devices panel 902, by manually creating one or more devices, or by loading devices from an external source. During the selection of the triggering devices, the console provides attribute filters that can be used to define the triggering devices. For instance, a user may initially select an entire device group. The actual triggering devices from device group may then be filtered based on various attributes. For instance, an attribute may be the timestamp when a device last fired the trigger, thus preventing the same triggering device from firing a trigger too often. The attributes can be device attributes, group attributes, landmark attributes, or attributes of the user of the device.

In an embodiment, triggering devices can be selected by filtering all of the devices from the devices panel 902, filtering all of the devices from a file, filtering all of the devices from a database, or filtering all of the devices from a specific group or subgroup. Additional filters can also be based on the type of the device. For instance, for mobile devices and smartphones, the filter may be the area code of mobile devices. In such a case, if a user specifies a filter for area code having a value of "775", then all of the devices in the device tree having an area code of 775 would be automatically be included as part of the triggering devices associated with the event being created. More than one filter can be applied. For instance, devices having an area code of "775" and being within a defined landmark may trigger a specific action. The use of filters thus allows the user to define with flexibility the triggering devices. By simply defining the filter, the user need not continuously update the triggering devices associated with an event. Instead, whenever a new device is added that meets the criteria of the filter, it is automatically added as part of the triggering device of an event. Similarly, if the attributes of a device change, the user need not manually remove such a device, with the filter automatically excluding the device from the triggering devices associated with the event.

The console further enables the user to select the desired action associated with one or more triggers. The user can associate a first action with a first trigger, a second action with a second trigger, and so on. Alternatively, the user can associate the same action for one or more different triggers. Different action recipient devices can also receive different actions associated with the same trigger, with a first device meeting a first set of conditions being the recipient of a first action, and a second device meeting a second set of conditions being the recipient of a second action. Actions can include the delivery of navigation or routing guidance, control of a device function, the invocation of a third party API call, sending a notification to another user, sending a notification to another device, sending a notification to a third party, or delivering content to the action recipient. In terms of delivering content, the content can be delivered via SMS, email, MMS, instant message, a message through a social networking website, or a geo-message, such as a ZHIING, as described above. The message can also be delivered through more than one means to the same receiving device, such as by receiving both an email and an SMS.

Figure 11:
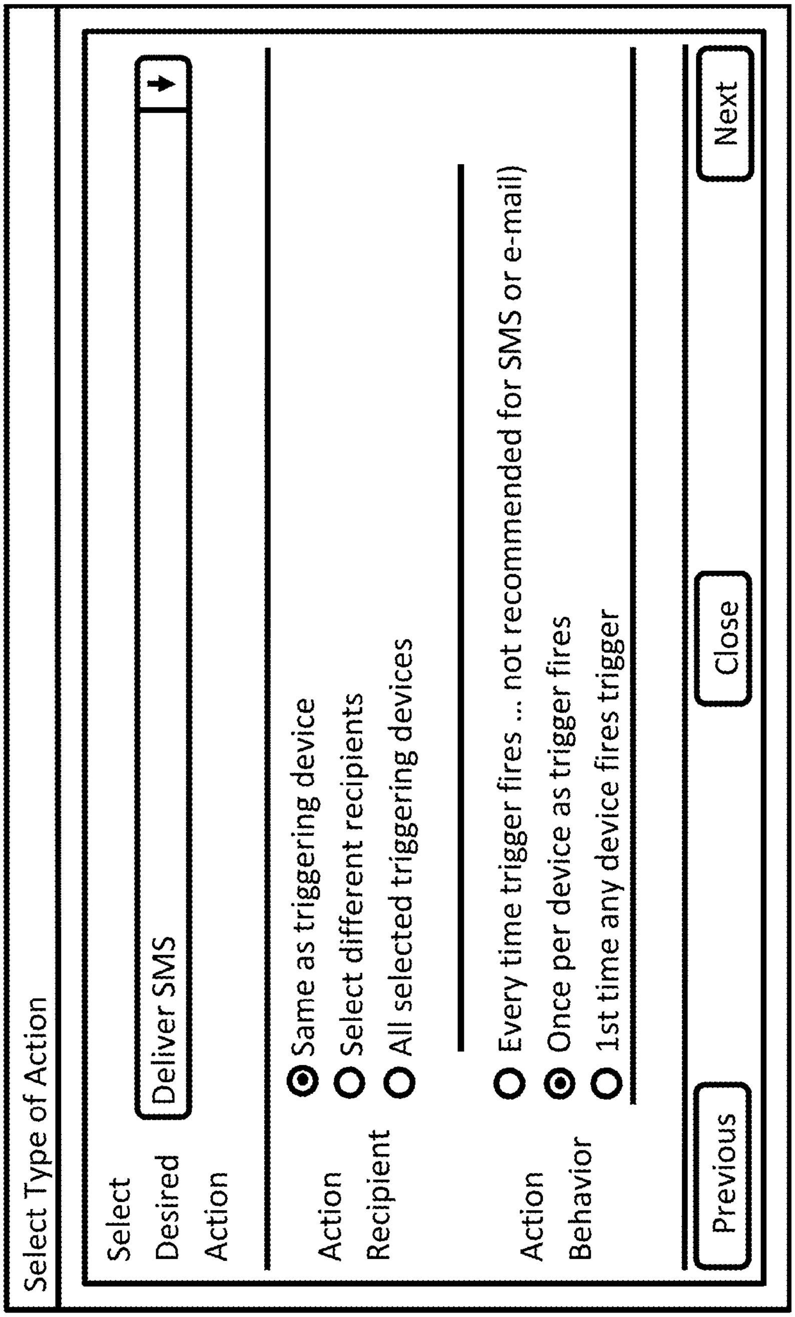
FIG. 11 illustrates a dialog window of the console that provides controls for selecting actions associated with a trigger.

FIG. 11 illustrates the dialog window, in accordance with an embodiment, allowing a user to select an action associated with a trigger. Different options are displayed depending on the trigger and depending on the action selected. The drop down menu allows the user to select an action from a plurality of actions. In the present case, delivering an SMS is selected as an action, and options associated with this action include selecting the action recipient and action behavior options.

As noted above, action recipient devices can be different than the triggering devices. The wizard event tool thus provides options and different screens for selecting triggering devices and action recipient devices. The console further enables the user to specify the recipient devices, which may be the same as the triggering devices. If the recipient devices are to be different than the triggering devices, the user can specify the receiving devices by selecting the recipient devices from the devices displayed on the map, from the devices panel 902, or by loading the recipient devices from an external source. The recipient devices need not be physical devices of recipient users, but can also include accounts to which recipient users can receive notifications or alerts. For instance, this can include an email account, an instant messaging account, an account for a social networking site, etc.

When editing an event, the console 900 can also include options for specifying the repetition frequency of the action associated with the trigger. For instance, the user can specify that the action is to be performed every time the trigger fires (optionally including a minimum amount of time before the trigger is allowed to fire again), once per device as the trigger fires, once per device group as the trigger fires, the first time any device fires the trigger, etc. The frequency of the trigger firing can be controlled as an instance for each device, as an instance for a device group, or as a global instance for every device.

In an embodiment of the console, different actions can also be associated with different time frames. For instance, a first action can be performed the very first time a trigger is fired by any device. Any time after, a second action can be performed when the trigger fires. Other actions can also be performed randomly, or at predefined intervals. For example, if the event consists of distributing coupons to devices within proximity of a restaurant, then a coupon with a special value can be distributed at a random time, or once for every 10 times a normal coupon is distributed, etc.

The action associated with a trigger can also be changed after some period of time or after the trigger has been fired a number of times. For example, for the first month of the event, a first action may be performed when a trigger is fired; at the end of the first month, the action may be changed to a second action. Alternatively, if the number of times the trigger has fired exceeds a threshold, the action may change from a first action to a second action. All in all, embodiments of the console provide flexible controls for customizing actions associated with triggers. It is to be understood that the actions associated with a trigger can range from the delivery of a message to a triggering/receiving device, performing a function on the triggering/receiving device, updating a status of the triggering/receiving device on the console, changing one or more attributes of the triggering/receiving device on the console, installing an application on the triggering/receiving device, updating a status of the triggering/receiving device on a third party system, delivering data from a third party system to the triggering/receiving device, among other functionality.

As noted above, the console provides an editor for creating messages that can be delivered to action recipient devices. Through the editor, the user can add text, add graphics, add attachments to be included with the message, and load a message from a file. The message content can be simple text, HTML, a PDF document, an image, multimedia, or a combination of these. The data included in the message can also be created by a third party, with the message including a link or reference to the third party content. For example, if using HTML to render the message, the HTML code can include a reference to content created by a third party. This would enable a third party to control the content and formatting of the message without having access to the console and without making changes to the event.

Figures 12A, 12B:
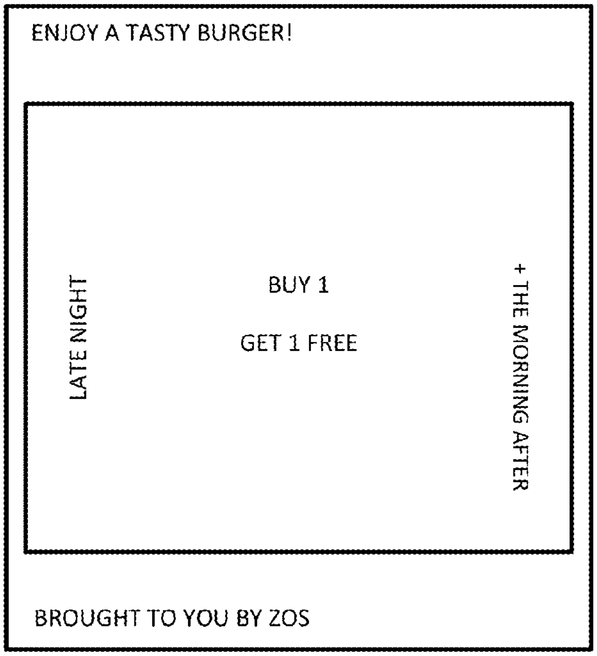
FIGS. 12A and 12B illustrates an example rich content message delivered as an HTML payload in an XML envelope in accordance with an embodiment.

The content of messages can be delivered to devices using various methods. In one embodiment, an XML feed is used to deliver content in messages to the recipient devices. FIG. 12A illustrates an example of a rich content message delivered as an HTML payload in an XML envelope. The resulting content as displayed on the receiving device is illustrated in FIG. 12B. As noted above, the content of messages can also be delivered as SMS, MMS, an email, a message through a social networking site, a posting through a social networking site, an instant message, etc. In one embodiment, a message including a prompt is initially sent to the device. The device recognizing the prompt, intercepts the message and prevents the message as being handled as a standard message. The prompt may then cause the device to automatically communicate with a remote location which may download or stream the content to the device.

Messages delivered to recipient users and/or recipient devices can include embedded code that provides the receiving device with navigation instructions to a point of interest. Alternatively, the message can include a map with the navigation information, or can also include a prompt that automatically runs the native navigation system on the device or that automatically runs an alternative application on the device. In embodiments, the prompt identifies the message as a message to be processed by a different queue, rather than being processed as a standard message. If a message does not include a prompt, then the message can be forwarded to the standard text messaging queue or to the corresponding messaging queue. The same applies for other types of messages, including MMS, email, instant messaging and messages through social networking sites. Finally, message exchanges can initiate voice or static routing in third party mobile mapping systems, including GOOGLE MAPS, BLACKBERRY MAPS, OVI, VZ NAVIGATOR, GOKIVO, TELENAV, and TELMAP.

Overall, embodiments of the console enable a user to define an event that occurs when certain users arrive to a target area, with the event firing during specific dates, and during different times of the day, with recipient devices being the recipients of actions associated with triggers fired. If the event includes one or more points of interest, then the action can also include using the native navigation system of the receiving device to direct the user to the points of interest. If the device does not include a native navigation or mapping system, the message can include a prompt that automatically launches the web browser on the recipient device and uses a web mapping service to provide the navigation to the points of interest. The message can also include a map with navigation instructions, or simply text instructions to the points of interest, as described in embodiments above. Finally, an event need not be associated with a target area, and can instead be based on other contextual factors.

As noted above, multiple areas can be used to define a single landmark. These multiple areas can overlap or they also can be drawn such that they do not overlap. For instance, the landmark may consist of a circle around a point of interest, with the circle having a radius of 100 feet. Adjacent to the circle can be a second polygonal area drawn with the freeform shape tool of the console. The combination of areas can then be used to create complex landmark shapes. The complex landmark shapes can be used to define the same action for a plurality of landmarks, to define variations of the same action for landmarks among the plurality of landmarks, or to define different actions for landmarks among the plurality of landmarks. For example, if a user is interested in creating a campaign for a plurality of stores within a city, then the landmark can comprise of a circle surrounding each store in the city. A single event can then be associated with the plurality of stores within the city. FIG. 9 illustrates landmark 916 consisting of a circular shape and a polygonal shape. It is also possible for landmarks 912, 914 and 916 to be combined into a single landmark even though those landmarks do not physically overlap.

In one embodiment, more than one trigger can be associated with a single event. For instance, a first trigger may consist of entering an area, while a second trigger may consist of speed exceeding a speed threshold. When using more than one trigger for a single event, all of the triggers can result in the same action or different triggers can result in different actions being executed. A first trigger can result in a first action, such as sending a message to the triggering device, while a second trigger can result in a second action, such as sending a message to a device different than the triggering device.

Two or more triggers can also be combined using rules and/or Boolean logic. For instance, a Boolean rule may indicate that if both a first trigger and a second trigger fire (both are true), then perform a first action. On the other hand, if the first trigger fires (true) but the second trigger doesn't fire (false), then perform a second action. There are many ways in which triggers can be combined using rules and Boolean logic to perform a wide range of actions. For instance, the example described above can incorporate a time variable, such that if the first trigger fires and the second trigger has not fired in the last hour, then a third action is performed. The rules for combining triggers and their associated actions can all be defined through the console interface. Embodiments of the console can include a script editor enabling the user to write the trigger logic using various scripting or programming languages. The console may further provide an upload script option for enabling the loading of a script from a file or from some other external source.

As described herein, triggers can be used for any type of events, including the monitoring by an employer of company owned devices, the monitoring by a parent of the devices assigned to members of the family, the monitoring by school officials of devices assigned to students, the monitoring of devices by a store renting devices to customers, etc. For instance, the speed trigger can be used by a parent to send a notification to the parent whenever the device if one of the family members detects that a maximum speed limit is exceeded while driving. This event can be defined by using a speed trigger, where the maximum speed is the threshold that fires the trigger, and where the action is sending a notification message to the parent.

In the case of workforce management, embodiments can be used to define an action performed whenever a first user is within certain proximity of a second user. The action may be sending a notification to a third party, sending a notification to the first user and/or the second user, sending a password or a document to the first user and/or the second user, opening a door, sending a key for a document, etc. In a military application, two particular users may have to be close to each other in order for both of them to have access to a building within a military base. The console would then enable a military official to define an event where the trigger is proximity between the two users, and where the action is access to the building within the military base. The military official could also use the console to define escort permissions within the military base. For example, a proximity trigger can be defined, with the action being access to restricted sections as long as a first user is escorted by a second user (first user remains within proximity of the second user having access permissions).

The triggers and actions can also be used for tracking of personnel or equipment. For instance, if User A is separated from Vehicle B or if User A is separated from User B, taking an appropriate action. A location trigger and/or proximity trigger can also be used to perform actions when a first user is separated from a second user. If the first user is separated more than a proximity distance from the second user, then an appropriate action can be taken.

As noted above, the action can be defined through the console or it can be a notification sent to a third party system, enabling the third party system to perform the appropriate action. Triggers and actions can thus be separately defined by third parties and by the console user(s). For example, if a user enters an area, a notification may be sent to the third party system, enabling the third party system to take an appropriate action, such as sending an alarm, creating an entry on an access log, taking a photograph of the area after the user enters the area, delivering a sound message through speakers on the area entered by the user, etc.

Embodiments disclosed herein can be used for data security. In an embodiment, an event can be created such that when a device enters a secure area, predefined rules enable devices to access secure documents. The content can be automatically deleted when the devices leave the secure area. The secure area can be defined by the user manually drawing a polygon, a geo-fence, or by loading geo-fence area from a file. The event can include two triggers, one for entering the area and one for exiting the area. Upon the user entering the area, the user can be provided with an access key to access the secure documents, and upon the user exiting the area, the access key and any documents accessed can be automatically deleted from the device.

Events or campaigns can also be based on third party triggers, with the action being defined through the console or defined by a third party system. For instance, third party triggers can include weather related triggers, triggers associated with data from a vehicle, triggers associated with data from a building, triggers associated with data from an emergency dispatch system, or any other type of third party data. For example, users located within a certain proximity distance from a detected tornado can receive a warning message regarding the tornado, including evacuation routes. Similar actions can be performed in other disaster situations, such as floods, earthquakes, fires, etc.

In one embodiment, the console includes triggers based on sensor data gathered from devices. Sensor data from a device can include Wi-Fi data, GPS data, microphone data, camera and/or video data, Bluetooth data, accelerometer data, cell radio data, etc. For instance, an accelerometer trigger may fire when the device is in proximity to an event monitored by the device's accelerometer, such as a blast wave, an abrupt stop, or a sudden drop. Duration triggers are based on event time or time intervals, which can be set by the console or by the device. Further triggers include device battery level, where the trigger can be based on whether the battery level is increasing, decreasing, or has reached a certain level; device power source, where the trigger is based on whether the device is connected or not connected to an external power source; and device signal level, where the trigger is based on the device's proximity to a wireless access point, a cell tower, or whether the device has lost signal. As noted above, triggers can also be based on external data, including weather service alerts or public service announcements.

In one embodiment, an external system can initiate a new event independently that triggers an action to occur, with the recipient of the actions being one or more devices. External service call triggers are triggers managed by external systems, i.e. third party systems. Alternatively, the devices themselves can trigger third party external systems and services to perform actions. A device coverage trigger can trigger an action if there are too few resources in an area. For example, if the trigger requires 10 responders per square mile, and there are less than 10 responders, then an action can be performed. This action may include sending a message to additional responders, notifying an administrator, or updating a status associated with the area to reflect the number of actual responders. The device coverage trigger can also initiate actions when the right number of personnel is reached or when there is an excess of personnel in an area.

Embodiments of triggers described herein can be used to prompt the delivery and extraction of data into and out of a communication channel on the mobile device independent of SMS, MMS, and e-mail. The triggers can also be used to execute device functions or to command a variety of third party external services, such as by using web service calls or by using an alternative communication protocol or a remote procedure call.

Embodiments of the console can be used to define area-based rules by drawing freehand polygons, radius-defined circles, or preloaded or imported shapes on a map displayed on the console. For example, one embodiment can support the loading of a building floorplan, a blast radius, a toxic plume pattern, the outline of an area identified as a disaster area, etc. The geo-fence associated with a landmark can be drawn once, or it can be modified continuously in response to changing conditions. In a particular embodiment, the console can receive a geo-fence feed from a third party system, with the console automatically updating the shape drawn on the map based on the location information received from the feed by the third party system. For example, in an emergency situation, the geo-fence of a disaster area landmark can be received from a feed generated by an emergency system.

Embodiments of the console can be used for a wide variety of scenarios. For example, the console can be used to deliver to a set of devices AMBER alert photos of a missing child or photos of a fugitive suspect. An action can include the updating of a device address book with emergency contact information depending on the trigger. Other actions can include intelligent routing information (such as evacuation instructions) embedded in the message delivered to recipients. For example, the intelligent routing information can provide users within an area with information regarding road closures in an emergency situation. Similarly, intelligent routing information can be provided to users who are to evacuate a building or some other area. Further actions can include establishing two-way communication with users within or outside an event boundary, and enabling users to upload pictures and other information of an emergency, victims, suspects, etc.

Actions can also be based on mobile device management features, such as over-the-air software downloads/removal/updates that enable/disable features depending on location or location-specific security requirements. The action can also disable or lock a device if necessary. For instance, if cameras are not allowed within a building or within a secure campus, then whenever a device enters the area, the trigger can disable the camera features of the device until the device exits the area. Within a classroom setting where mobile devices are not allowed, the mobile devices can be completely disabled except for emergency calls during the duration of the class or while the device is inside classrooms.

Embodiments of the console described herein are particularly useful for emergency managers and aid companies needing to send the right information to the right people quickly during a crisis. The console enables improved mobile device location accuracy and message targeting. In particular, embodiments take advantage of the wide remote sensing capabilities included in smartphones and other mobile devices, and uses them in creative ways to automate notification and other emergency functions through location and environment based triggers and geo-fences.

As an example, an Incident Commander (IC) can use the console to create an event associated with a wildfire zone. The IC can draw a geo-fence around the wildfire zone based on fire propagation models and weather data. The event, and the geo-fence drawn by the IC, can be viewed by other ICs that have joined in the response. The primary IC can also set permissions and security preferences, thus restricting who can view the event and data associated with the wildfire zone. Devices within the area can automatically receive messages alerting of the fire's status. The alert can include commands and routes to evacuate. For example, the users within the fire zone can receive instructions on how to evacuate, the time period available for evacuation, and a suggested route to exit the fire zone. The alerts can be delivered to users who have opted-in to receive such alerts, or alternatively all devices within the fire zone can receive such alerts.

Embodiments described herein enable users to create events with geo-fences that allow emergency response authorities to target emergency information to just those individuals affected. Location awareness affords message specificity for each audience, eliminating confusion during a crisis. Informing the wrong people may create unnecessary panic and emergency calls, wasting resources, time and call center bandwidth. Thus, people outside the fire zone can receive an alert indicating them to remain at home, instead of receiving an alert that may wrongly give the impression that such users are also within the fire zone. The data delivered to devices can be updated automatically based on changing ground conditions.

As noted, for events defined in part by landmarks, and for the overall monitoring of the location of devices, determining accurate location of devices is important. Determining a phone's location typically requires the services of a carrier-based Position Determining Entity (PDE) for location lookup. This approach relies on radio cell towers to triangulate a user's location, and consequently places a burden on the carrier infrastructure. A phone's location can also be determined by using Global Positioning System (GPS) built into the mobile handset, which uses timing signals broadcast by GPS satellites. However, GPS has several limitations that impact its usability, such as inclement weather, cloud cover, buildings and other obstructions, thus making it unsuitable during severe weather events and in dense urban environments. Frequent GPS calls to the satellite, necessary for accurate positioning also place a great demand on a device's battery life. Assisted GPS (A-GPS) supplements GPS satellites with terrestrial towers when satellite access is unavailable, but also affects the device's battery life.

Embodiments disclosed herein provide a hybrid positioning system that uses a combination of various location data sources, including Wi-Fi, cell tower signals (cell ID), and local positioning systems (such as ad hoc Wi-Fi mesh networks). Embodiments further provide a carrier-grade location-based service which manages location acquisition of mobile devices completely independent of the carrier PDE infrastructure. Since the device location is managed by the network, embodiments offer a significant decrease in battery use while providing accurate positioning information. In addition, the location acquisition can include data from third party servers, databases, and other devices in the field.

One embodiment is comprised of a discrete agent that runs on client devices. The discrete agent effectively turns the device into a location sensor. The discrete agent gathers data from various location data sources, including GPS, Wi-Fi networks, and cell ID. The data gathered by the discrete agent is communicated to a remote location platform, which then uses the compiled data to determine a context of the data and to determine the location of the client device. The discrete agent provides the benefit of improved control over mobile device hardware and software. The discrete agent interacts with the device's communication and control modules, which manages device communications, security, resource management, the request queue, and the event handler. This enables the discrete agent to fully utilize device sensors and the core features they enable. Device sensors can include Wi-Fi radio, GPS, microphone, camera, Bluetooth, accelerometer, cell radio, etc. Core features enabled by these sensors can include location acquisition, mapping integration, messaging, acceleration detection, etc. While the discrete agent gathers data from the various sensors of the client device, it is not necessary for the discrete agent to interact with third party applications installed on the device. That is, one embodiment of the discrete agent can be implemented to transmit gathered data at a cadence to a remote location platform, with the discrete agent having no further interaction with third party applications or other services running on the client device.

The discrete agent further provides management of the client device sensors and processes gathering data from the sensors, which can have a significant impact on battery life. For example, continuous data polling or periodic location updates can reduce significantly the battery life of a client device. In an embodiment, a set of rules and triggers can be used to adjustment the behavior of the discrete agent. For example, a trigger set up by the user can change the cadence of the transmittal of sensor data when the battery life is below a threshold. The configuration and behavior of the discrete agent can also be configured remotely by transmitting a message to the discrete agent, with the message including commands for changing the settings of the discrete agent. This would enable a console user to change the settings for the discrete agent of a plurality of devices via the console 900, with the console transmitting the corresponding settings (or commands to change the settings) to the plurality of devices.

The behavior of the discrete agent can also be defined using a set of rules. For example, the rules may indicate that the client device should not communicate sensor data to the remote location platform if the location of the client device has not changed. The rules may also indicate that if the client device is plugged in to a power source, the client device should communicate sensor data at a faster cadence. Other rules may indicate to lessen the cadence of transmitting sensor data if the battery life is low or increase the cadence of transmitting sensor data if the battery life is high.

The discrete agent can be deployed in a number of ways. Devices can be pre-configured with the discrete agent or the discrete agent can be received via a download. The install of the discrete agent on a device can also be an action associated with an event defined through the console. Embodiments of the discrete agent work natively on most application-enabled phones, including BLACKBERRY, ANDROID, WINDOWS MOBILE, WINDOWS PHONE 7, IPHONE, SYMBIAN, MAEMO, BREW, BADA, and JAVA. Embodiments disclosed herein are also compatible with all major third party mobile mapping systems, such as GOOGLE MAPS, BING, OVI, VZ NAVIGATOR, BLACKBERRY MAPS, GOKIVO, TELENAV, ESRI, and TELMAP.

The discrete agent allows mobile developers to easily integrate the capabilities of embodiments described herein into third party applications. Embodiments of the discrete agent provide hybrid location acquisition and lookup, message event notification, location event notification, generic transport interface, version check and query, and opt-in registration mechanism.

The discrete agent has two components used for third party application integration: a discrete agent service and a discrete agent client. The discrete agent service is a background service that runs on the client device and it is responsible for the discrete agent logic and communication with the remote location platform. The discrete agent client is a library that is integrated into third party applications and which provides an API enabling the third party applications to interact with the discrete agent.

Figure 13:
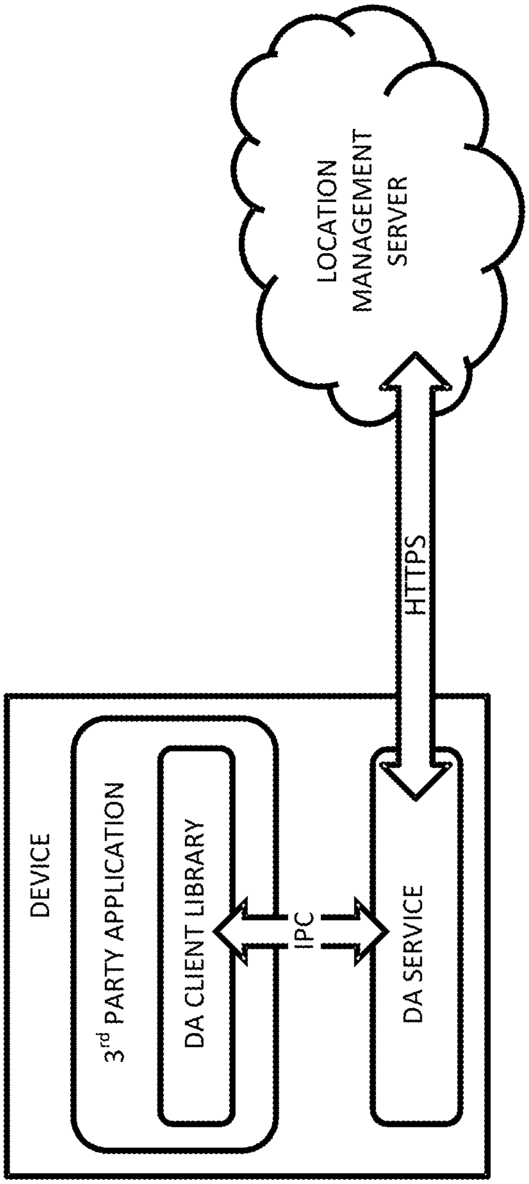
FIG. 13 illustrates a first method of integrating a discrete agent in a third party application in accordance with an embodiment.
Figure 14:
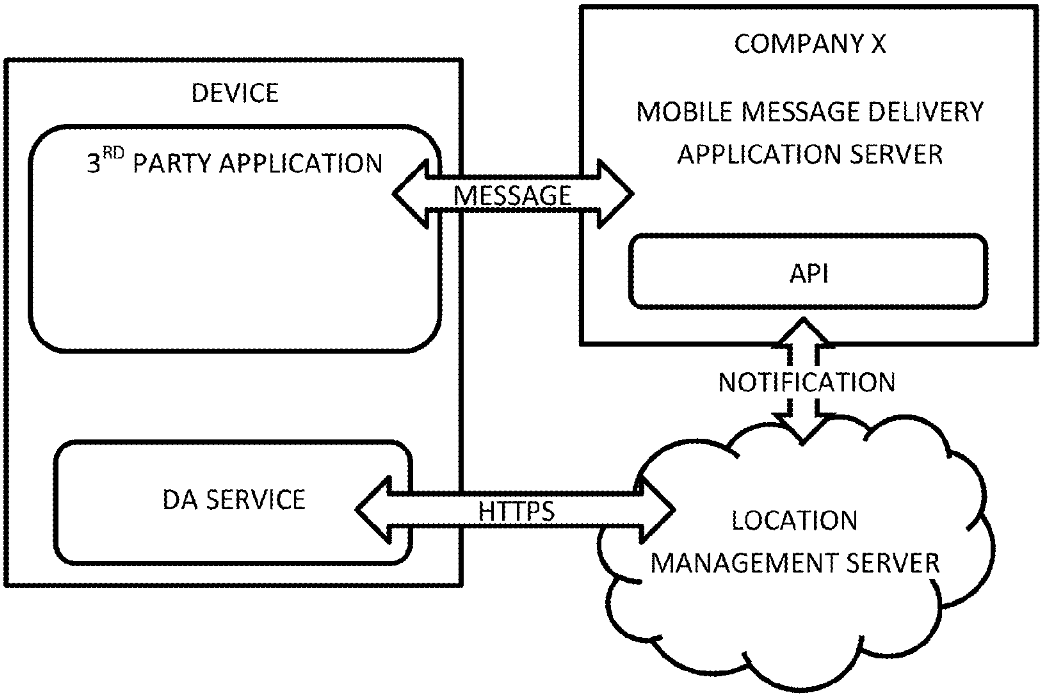
FIG. 14 illustrates a second method of integrating a discrete agent in a third party application in accordance with an embodiment.

FIGS. 13 and 14 illustrate two methods for deploying and integrating the discrete agent with the client device and with applications on the device. FIG. 13 illustrates an embodiment where the discrete agent is directly embedded into a third party application via a software development kit. In this embodiment, the remote location platform (the location management server) sends a message to the client device either as a geo-message (ZHIING) via the discrete agent or as a standard SMS/MMS text. As noted above, it is also possible to send the message via an alternative means, such as email, instant message, etc. The discrete agent notifies the third party application that a new message is available on the server. The discrete agent APIs allow for the listening of the message notification and for the retrieval of the message.

FIG. 14 illustrates an alternative embodiment for deploying and integrating the discrete agent. The discrete agent runs as a separate process from the third party application, with the third party application interacting with a messaging server. The discrete agent interacts directly with the location management server to provide location information and data gathered from the sensors of the device. When the device fires a trigger, such as by entering a geo-fenced area, the location management server notifies the third party messaging server that an event has been triggered. The messaging server then delivers the corresponding message to the mobile device. The notification sent from the location management server to the messaging server can be a simple notification, with the messaging server creating the message and the content sent to the third party application. Alternatively, the location management server can create the message and the content, and the messaging server can forward the corresponding message in the appropriate format to the third party application.

Embodiments of the discrete agent include capabilities for location acquisition and lookup, message event notification, location event notification, generic XML transport interface, version check/query, and opt-in registration mechanism. As noted above, the agent can utilize all available methods within the device to acquire location information. The discrete agent can also provide services to convert addresses and other location information into a latitude/longitude point (geo-code) and vice-versa (reverse geo-code). The message event notification service provides a mechanism to notify an application that a new message has arrived from the server for that application.

The discrete agent further allows third party applications within the client device to register to receive location updates. When a location update is received, a notification can be sent to all of the applications which are registered to receive location updates. Third party applications can also request on demand the current location of the device. The demand for the current location can also include an accuracy value and a timeout value. The accuracy value specifies the minimum acceptable accuracy, and the timeout value specifies the maximum time to wait to obtain a location meeting both the accuracy value and the timeout value. Depending on the implementation, the accuracy value can be specified in meters or in some other unit of length. Similarly, the timeout value can be specified in seconds, minutes, or in some other unit of time. For example, if the accuracy value is five meters, and the timeout value is one minute, then the agent will attempt to obtain a location of the device within one minute that is accurate to within five meters. If a location cannot be obtained that meets the accuracy value and the timeout value, then an error can be returned to the requesting application. Alternatively, the location that most closely matches the requested accuracy can be returned to the requesting application. A demand for a current location may include only one of the accuracy value and the timeout value. If only an accuracy value is provided in the request, then the agent will return the location that meets the accuracy value within a default timeout period. Alternatively, if the user only specifies the timeout value, then the agent can return the location with the highest accuracy achieved within the specified timeout period. Thus, the agent can operate with a default timeout value and with a default accuracy value.

The data gathered by the discrete agents within client devices, and compiled by the location platform, can be made accessible to third parties via an API. Third parties interested in the location of a plurality of devices can thus use the API to obtain accurate location data about the plurality of devices without having to actually poll or query the plurality of devices. The API also allows third parties to request location data according to an accuracy value and a timeout value. A third party can thus query the location platform to obtain location data that is accurate to within 10 meters and that is less than 5 minutes old for the plurality of devices. The location platform can then poll the plurality of devices, if necessary, to obtain location data that meet the accuracy and timeout values. If the timeout value is met, but the accuracy value is not met, then the location platform can recalculate the location of the plurality of devices using a more accurate method, such as by using a hybrid or machine learning method. While embodiments are described herein as being used by third parties to obtain location data from the location platform, third parties can also use the API to the location platform to obtain additional sensor data and other data gathered from the plurality of devices. To implement this, the discrete agent can be configured to communicate specific data to the location platform.

In an embodiment, the discrete agent can be configured to specifically communicate certain type of data to the remote location platform. For example, a console user can select one or more types of data from a plurality of data types to be communicated to the remote location platform. The console user can also configure the discrete agent to communicate additional attributes and other data from the client device to the remote location platform. The additional location data can include usage patterns, hardware specifications, list of software and applications installed on the client device, etc.

Figure 15:
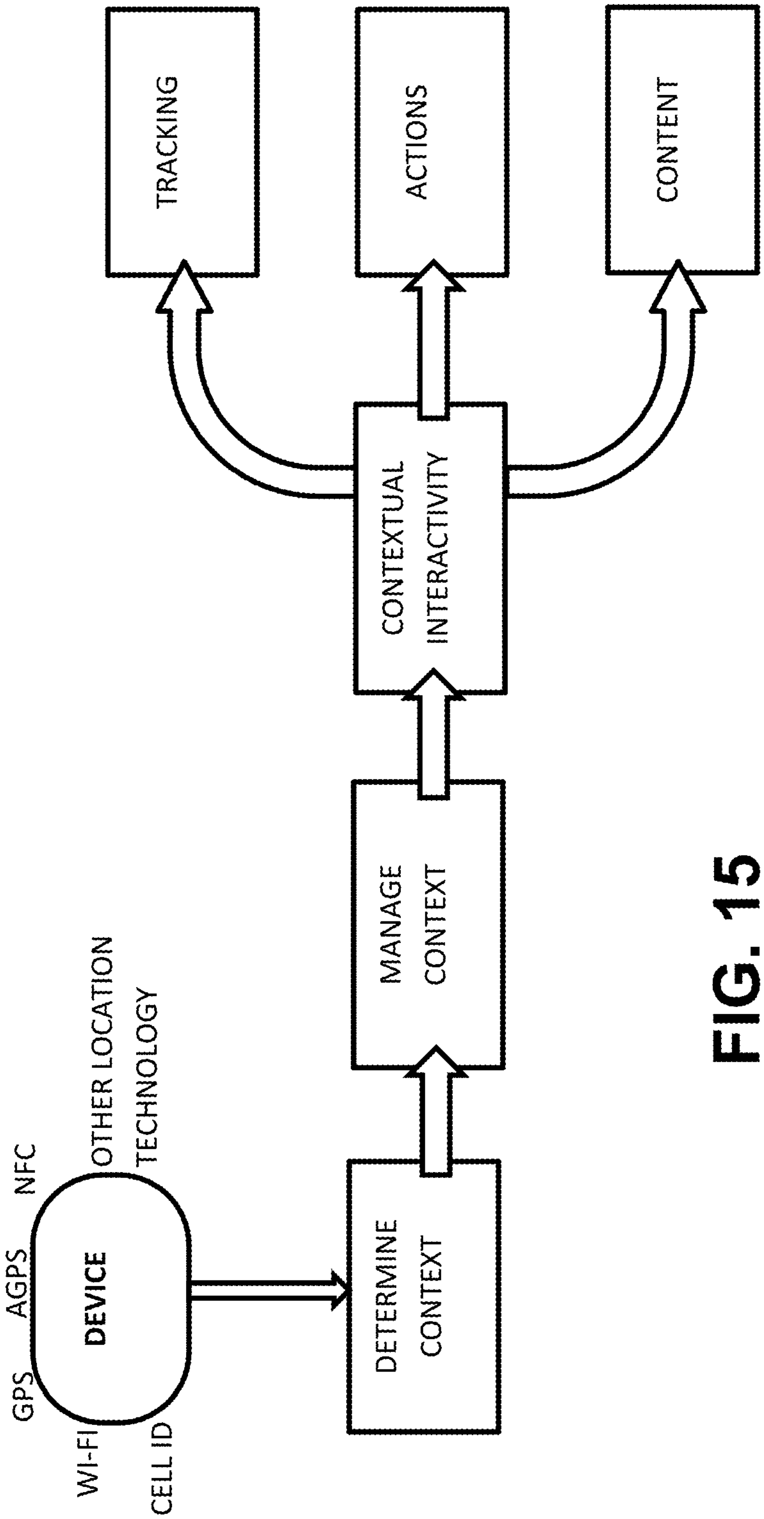
FIG. 15 illustrates a pipeline for gathering and monitoring the data of devices as implemented by the console in accordance with an embodiment.

FIG. 15 illustrates the pipeline implemented by the console in accordance with an embodiment. A device provides sensor data, with the sensor data coming from a plurality of sources including GPS, AGPS, NFC, Wi-Fi, Cell ID, and other location technologies. The plurality of sensor data is combined to determine a contextual data. The contextual data is then used for context management. The network tracks the location of the device, with the device simply gathering sensor data (it is noted that it is also possible for the device to track its own location if necessary). Other information that can be tracked includes cross-device communications. Finally, contextual interactivity uses a full suite of tools to automate triggered events. Parameters for triggers include geocontextual data, personalized data, sensor data, etc. Actions can then include delivery content, such as SMS, MMS, Push, and other types of content delivery. Actions can also include content delivery to other devices, content delivery to third party applications, actions performed on third party systems, actions performed on the device, modifying a behavior of a function of the device, modifying a behavior of a function of another device, or modifying a behavior of a function on a third party system.

Embodiments disclosed herein provide a complete solution that harnesses hybrid location. Hybrid management of multiple location origins is performed by gathering location information from the network, from the location platform, from third party databases, or from an alternative location. The data is stored by the location platform. The hybrid location acquisition can be performed on 2G, 3G, and 4G devices. Sensor data is gathered from GPS, AGPS, Wi-Fi, NFC, and Cell ID. Additional location sources include network location, third party location aggregators, third party location databases, and other location technologies.

The location need not come directly from a device. Instead, the location information associated with one or more devices can be received from a third party source. For example, the location can be received from the carrier or the service provider of the device. Alternatively, a third party source can be dedicated solely to gathering location feeds from one or more devices. The console can then interface with the party source to enable a user to visualize the location feeds from the various devices.

As noted above, in an embodiment the discrete agent can gather all of the sensor data. The sensor data can then be processed for accuracy and analyzed within the device or in the network. By processing and storing the sensor data on the network, or remotely, the storage of the device is not used and the battery life of the device is not affected drastically. Battery rules can also be used to control the functions performed by the device versus functions performed on the server. The device can intercept GPS calls with "WiFi" first or "CID movement validation". The server can also manage use requirements, accuracy rules, and location database fall back.

Embodiments of the console enable location management and location interactivity in a carrier and device agnostic approach. The location management server enables data collection, location acquisition with accuracy determination, location authorization, and tracking Location interactivity enables content delivery, event creation and expiration, geocoding and reverse geo-coding, geo-fencing, location acquisition with accuracy determination, and point of interest creation and integration.

Communication with the location platform (location management server) can be done via SOAP, HTTP, HTTPS, or via an alternative communication protocol. Embodiments can use SOAP formatted requests, passing parameters as XML values in the body of the SOAP request. The requested data can be returned as XML values in the body of the SOAP responses. SOAP is an XML formatted messaging protocol that is used in the implementation of web services to exchange structured information between systems. This XML based protocol consists of three parts: (1) an envelope, which defines what is in the message and how to process it; (2) a set of encoding rules for expressing instances of application defined data types; (3) and a convention for representing procedure calls and responses.

In an embodiment, the console can use a hybrid location mechanism that uses a weighted average method and/or a pattern recognition method. From herein, the device whose location is determined using the weighted average method and/or the pattern recognition method will be referred to as the "querying device."

In an embodiment, a querying device scans wireless channels for wireless access points (WAPs) visible within the wireless range of the querying device. The querying device receives at least a signal strength and identifier information associated with each of the WAPs. Such identifier information can include the MAC address of the WAP, the service set identifier (SSID) of the WAP, a combination of the MAC address and the SSID, or some other unique identifier of the WAP. The list of visible WAPs is used to query a database containing location information for a plurality of WAPs. If a WAP detected by the querying device is in the database, then the location of that WAP is returned to the locationing system. The locations for all WAPs found by the query to the database are then used by the locationing system to compute the location of the querying device, which is returned to the querying device. In an embodiment, the weighted average of the locations returned in the database query is computed to determine the location of the querying device, with the weight for each of the locations being the current signal strength detected by the querying device.

A pattern recognition algorithm can also be used in place of or in combination with the weighted average method. The pattern recognition algorithm is trained with the database of WAP information. The pattern recognition algorithm has a number of inputs at least equal to the number of WAPs for which data is available in the database. If there is data for three WAPs in the database, then the pattern recognition algorithm would have at least three inputs. The number of outputs of the pattern recognition algorithm is equal to the number of possible regions within which the querying device can be located. If the querying device can be in one of three possible regions, then the number of outputs of the pattern recognition algorithm would be three.

The pattern recognition algorithm is trained with signal strength readings, to allow the pattern recognition algorithm to develop an association between particular combinations of signal strengths of WAPs and regions. After the pattern recognition has been trained, the pattern recognition algorithm can receive, as inputs, current signal strength readings, and provide, as an output, the region where the querying device may be located. Embodiments can use neural networks, classifier systems, clustering algorithms, etc.

The location management server assists in managing the location of devices and establishing interactivity triggered by location and other device-centric events. The platform includes capabilities for device management and location tracking, landmark management, message content management and delivery, event management and processing based on a variety of geo-contextual triggers. Geo-contextual triggers include landmark locations, proximity to other mobile devices, and device speed.

While the present disclosure illustrates and describes a preferred embodiment and several alternatives, it is to be understood that the techniques described herein can have a multitude of additional uses and applications. Accordingly, the disclosure should not be limited to just the particular description and various drawing figures contained in this specification that merely illustrate various embodiments and application of the principles of such embodiments.

What is claimed:

1. A computer-implemented method of managing a geo-targeted event, comprising the steps of:

defining a set of devices associated with the geo-targeted event;

defining a geo-fenced area associated with the geo-targeted event;

selecting one or more triggers among a plurality of triggers associated with at least the geo-fenced area, wherein the one or more triggers fire in response to one or more conditions of a client device;

monitoring the one or more conditions on the set of devices;

delivering a message including a prompt to a device among the set of devices when the one or more conditions are true;

opening a communication channel between the device and a location management server; and performing one or more actions on the device in response to requests sent from the location management server.

2. The method as recited in claim 1, wherein the step of defining a set of device includes the steps of:

defining a set of triggering devices monitored for firing the triggers; and defining a set of action recipient device, the action recipient devices receiving the message including the prompt in response to a triggering device among the set of triggering devices firing a trigger.

3. The method as recited in claim 1, wherein the step of defining a geo-fenced area includes the steps of:

enabling a user to select a single point on a map displayed to the user;

enabling a user to select one or more points defining an outline of the geo-fenced area;

enabling a user to specify an address on the map; and enabling a user to draw a circle around the single point.

4. The method as recited in claim 1, wherein the step of defining a geo-fenced area includes the step of selecting one or more points of interest within the geo-fenced area.

5. The method as recited in claim 4, further comprising the step of selecting one or more navigation points defining a route to the one or more points of interest.

6. The method as recited in claim 1, wherein the one or more triggers can be combined using Boolean logic.

7. The method as recited in claim 1, further comprising the step of selecting one or more triggers associated with data from a third party.

8. The method as recited in claim 1, wherein the step of monitoring the one or more conditions includes testing of data gathered from one or more sensors of the client device.

9. The method as recited in claim 8, wherein the one or more sensors include Wi-Fi radio,GPS, microphone, camera, BLUETOOTH, accelerometer, cell radio, and NFC.

10. The method as recited in claim 8, wherein the one or more conditions include a location of the client device.

11. The method as recited in claim 10, further comprising the step of tracking the location of the client device on a location management server and without using the Positioning Determining Entity of the carrier of the client device.

12. The method as recited in claim 10, further comprising the step of determining the location of the client device by combining one or more location data sources, the one or more location data sources including GPS, AGPS, NFC, Wi-Fi, Cell ID, and third party data sources.

13. The method as recited in claim 1, wherein the plurality of triggers include entering the geo-fenced area, exiting the geo-fenced area, being in the geo-fenced area, being out of the geo-fenced area, proximity to a different device, proximity to the geo-fenced area.

14. The method as recited in claim 1, further comprising the step of performing one or more third party actions on a third party system in response to the one or more conditions being true.

15. The method as recited in claim 14, wherein the one or more third party actions include delivering a third party message to the third party system, updating a status of the third party system, and deploying a function on the third party system.

16. The method as recited in 1, wherein the one or more actions include delivering advertising content to the device, updating a status of the device, installing an application on the device, deploying a function on the device, and modifying a behavior of a function on the device.

* * * * *